US011994824B2

(12) United States Patent
Komatsu et al.

(10) Patent No.: US 11,994,824 B2
(45) Date of Patent: *May 28, 2024

(54) CARTRIDGE AND ELECTROPHOTOGRAPHIC IMAGE FORMING APPARATUS

(71) Applicant: CANON KABUSHIKI KAISHA, Tokyo (JP)

(72) Inventors: Noriyuki Komatsu, Numazu (JP); Shunsuke Uratani, Mishima (JP); Toru Oguma, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,245

(22) Filed: Oct. 11, 2022

(65) Prior Publication Data

US 2023/0032541 A1 Feb. 2, 2023

Related U.S. Application Data

(62) Division of application No. 17/378,877, filed on Jul. 19, 2021, now Pat. No. 11,500,324, which is a (Continued)

(30) Foreign Application Priority Data

Apr. 30, 2009 (JP) ................................ 2009-111127

(51) Int. Cl.
*G03G 21/16* (2006.01)
*G03G 21/18* (2006.01)

(52) U.S. Cl.
CPC ..... *G03G 21/1647* (2013.01); *G03G 21/1825* (2013.01); *G03G 21/1864* (2013.01)

(58) Field of Classification Search
CPC .......... G03G 21/1825; G03G 21/1864; G03G 21/1647; G03G 15/757
See application file for complete search history.

(56) References Cited

U.S. PATENT DOCUMENTS 5,768,658 A 6/1998 Watanabe et al.
5,903,803 A 5/1999 Kawai et al.
(Continued)

FOREIGN PATENT DOCUMENTS

JP S59-228281 A 12/1984
JP H05-30857 U 2/1993
(Continued)

OTHER PUBLICATIONS

Office Action in Japanese Patent Application No. 2017-096713, dated Jun. 26, 2018.
(Continued)

*Primary Examiner* — Sandra Brase
(74) *Attorney, Agent, or Firm* — Venable LLP

(57) ABSTRACT

A cartridge includes a drum flange provided at one end portion of a photosensitive drum. A coupling member is operatively connected to the drum flange, with the coupling member being configured to transmit the driving force to the drum flange. The drum flange has an opening at one end and is closed at another end, and the opening leads to a hollow interior portion. An end portion of a coil spring contacts an interior surface of the closed end of the drum flange, and the drum flange includes a housing and a cover member attached to the housing, with the closed end of the drum flange being a part of the cover member.

20 Claims, 38 Drawing Sheets

Related U.S. Application Data division of application No. 16/739,602, filed on Jan. 10, 2020, now Pat. No. 11,099,518, which is a division of application No. 16/253,903, filed on Jan. 22, 2019, now Pat. No. 10,551,790, which is a division of application No. 15/690,602, filed on Aug. 30, 2017, now Pat. No. 10,197,967, which is a division of application No. 14/063,091, filed on Oct. 25, 2013, now Pat. No. 9,772,598, which is a division of application No. 12/766,134, filed on Apr. 23, 2010, now Pat. No. 8,571,445.

(56) References Cited

U.S. PATENT DOCUMENTS

| | | | |
|---|---|---|---|
| 6,029,032 | A | 2/2000 | Watanabe |
| 6,097,909 | A | 8/2000 | Watanabe et al. |
| 6,175,706 | B1 | 1/2001 | Watanabe et al. |
| 6,272,299 | B1 | 8/2001 | Numagami et al. |
| 6,336,018 | B1 | 1/2002 | Kawai |
| 6,400,914 | B1 | 6/2002 | Noda et al. |
| 6,512,895 | B2 | 1/2003 | Sakurai et al. |
| 6,571,070 | B2 | 5/2003 | Oguma et al. |
| 6,574,446 | B2 | 6/2003 | Kitayama |
| 6,594,454 | B2 | 7/2003 | Oguma et al. |
| 6,768,890 | B2 | 7/2004 | Cho et al. |
| 6,804,475 | B2 | 10/2004 | Oguma et al. |
| 6,804,476 | B2 | 10/2004 | Yokoi et al. |
| 6,868,243 | B2 | 3/2005 | Watanabe et al. |
| 6,885,838 | B2 | 4/2005 | Kawai et al. |
| 6,907,212 | B2 | 6/2005 | Harada et al. |
| 6,993,264 | B2 | 1/2006 | Oguma et al. |
| 7,062,192 | B2 | 6/2006 | Oguma et al. |
| 7,072,602 | B2 | 7/2006 | Hatori et al. |
| 7,095,967 | B2 | 8/2006 | Karakama et al. |
| 7,110,703 | B2 | 9/2006 | Uratani et al. |
| 7,162,176 | B2 | 1/2007 | Oguma et al. |
| 7,239,823 | B2 | 7/2007 | Oguma et al. |
| 7,315,706 | B2 | 1/2008 | Oguma et al. |
| 7,623,811 | B2 | 11/2009 | Sato |
| 7,840,162 | B2 | 11/2010 | Suzuki |
| 8,229,324 | B2 | 7/2012 | Takigawa |
| 8,571,445 | B2 | 10/2013 | Komatsu et al. |
| 9,772,598 | B2 | 9/2017 | Komatsu |
| 9,778,613 | B2 | 10/2017 | Komatsu |
| 10,197,967 | B2 | 2/2019 | Komatsu et al. |
| 10,551,790 | B2 | 2/2020 | Komatsu et al. |
| 11,099,518 | B2 | 8/2021 | Komatsu et al. |
| 11,500,324 | B2 * | 11/2022 | Komatsu ........... G03G 21/1864 |
| 2002/0172531 | A1 | 11/2002 | Harada et al. |
| 2005/0286933 | A1 | 12/2005 | Kim |
| 2007/0059038 | A1 | 3/2007 | Shiraki |
| 2007/0140735 | A1 | 6/2007 | Karz |
| 2007/0248382 | A1 | 10/2007 | Oguma et al. |
| 2008/0152388 | A1 | 6/2008 | Ueno et al. |
| 2008/0170887 | A1 * | 7/2008 | Nishimura ......... G03G 21/1647 399/262 |
| 2008/0253800 | A1 | 10/2008 | Uratani et al. |
| 2010/0189462 | A1 | 7/2010 | Kawashima et al. |
| 2011/0255900 | A1 | 10/2011 | Zhou et al. |
| 2014/0112685 | A1 | 4/2014 | Kamatsu |

FOREIGN PATENT DOCUMENTS

| | | | |
|---|---|---|---|
| JP | H07-33253 | U | 2/1995 |
| JP | 2875203 | B | 3/1999 |
| JP | 2003-162137 | A | 6/2003 |
| JP | 2004-045603 | A | 2/2004 |
| JP | 2004-108481 | A | 4/2004 |
| JP | 2005-299788 | A | 10/2005 |
| JP | 2007-079139 | A | 3/2007 |
| JP | 2008-233867 | A | 10/2008 |
| JP | 2009-134284 | A | 6/2009 |
| JP | 6147312 | B2 | 6/2017 |

OTHER PUBLICATIONS

Office Action in Japanese Patent Application No. 2017-096713, dated Mar. 13, 2018.

* cited by examiner (a)

(b)

(a)

(b)

(a)

(b)

(a)

(b)

(a)

(b)

(a)

(b)

(a)

(b)

(a)

(b)

(a)

(b)

CARTRIDGE AND ELECTROPHOTOGRAPHIC IMAGE FORMING APPARATUS

FIELD OF THE INVENTION AND RELATED ART

The present invention relates to a cartridge detachably mountable to an electrostatic image forming apparatus and relates to the electrostatic image forming apparatus.

The electrostatic image forming apparatus may, e.g., include an electrophotographic copying machine, an electrophotographic printer (a laser beam printer, an LED printer, or the like), etc.

Here, the cartridge can be mounted in and demounted from an apparatus main assembly by a user himself (herself). Therefore, maintenance of the apparatus can be performed by the user himself (herself) without relying on a service person. As a result, a maintenance operation of the image forming apparatus is improved.

With respect to a conventional cartridge, in order to receive a rotational driving force for rotating a drum-shaped electrophotographic photosensitive member (hereinafter referred to as a photosensitive drum), the following constitution has been known.

On a main assembly side, a rotatable member for transmitting a driving force of a motor and a non-circular twisted hole, in which a plurality of rectangular portions in cross section is provided, which is provided at a central portion of the rotatable member and is rotatable integrally with the rotatable member are provided.

On a cartridge side, a non-circular twisted projection, having a plurality of rectangular portions in cross section, which is provided on one longitudinal end of the photosensitive drum and is engageable with the above-described hole is provided.

In the case where the cartridge is mounted in the apparatus main assembly, when the rotatable member is rotated in a state in which the projection is engaged in the hole, the rotational force of the rotatable member is transmitted to the photosensitive drum in a state in which the projection receives an attracting force with respect to a direction toward the hole. As a result, the rotational force for rotating the photosensitive drum is transmitted from the main assembly to the photosensitive drum (U.S. Pat. No. 5,903,803).

However, in the conventional constitution described in U.S. Pat. No. 5,903,803, when the cartridge is mounted in and demounted from the main assembly by movement of the rotatable member in a direction substantially perpendicular to an axial direction of the rotatable member, the rotatable member is required to be moved in the axial direction. That is, during the mounting and demounting of the cartridge, the rotatable member is required to be moved in the axial direction by an opening and closing operation of a main assembly cover provided on the apparatus main assembly. As a result, by an opening operation of the main assembly cover, the hole is moved in a direction in which the hole is spaced from the projection. On the other hand, by a closing operation of the main assembly cover, the hole is moved in a direction in which the hole is engaged with the projection.

Therefore, in the conventional constitution, by the opening and closing operation of the main assembly cover, there is need to provide the main assembly with a constitution for moving the rotatable member toward the rotatable axial direction of the rotatable member.

SUMMARY OF THE INVENTION

The present invention has developed the above-described prior art. A principal object of the present invention is to provide a cartridge demountable from an apparatus main assembly which is not provided with a mechanism for moving an apparatus main assembly-side cartridge member, for transmitting a rotatable force to the cartridge, in an axial direction of the cartridge member.

According to an aspect of the present invention, there is provided a cartridge for a main assembly of an electrophotographic image forming apparatus, wherein the main assembly includes a rotatable driving coupling member including a driving force transmitting portion for transmitting a driving force and a driving side abutment portion, wherein the cartridge is demountable in a direction substantially perpendicular to a rotational axis of the driving coupling member, comprising:

a rotatable driven coupling member including a driving force receiving portion for receiving the driving force, and a driven side abutment portion to be abutted by the driving side abutment portion, the driven coupling member being slidable in a predetermined direction which is substantially parallel with a rotational axis of the receiving coupling member;

wherein at least one of the driving side abutment portion and the driven side abutment portion is inclined so that the driven coupling member is retractable away from the driving coupling member in the predetermined direction by a force received by driven side abutment portion from the driving side abutment portion, and wherein a distance between the rotational axis of the driven coupling member and the abutment portion of the receiving abutment portion is not more than a distance between the rotational axis of the driven coupling member and the driving force receiving portion.

According to another aspect of the present invention, there is provided a cartridge for a main assembly of an electrophotographic image forming apparatus, wherein the main assembly includes a rotatable driving coupling member including a driving force transmitting portion for transmitting a driving force and a driving side abutment portion, wherein the cartridge is demountable in a direction substantially perpendicular to a rotational axis of the driving coupling member, comprising:

a rotatable driven coupling member including a driving force receiving portion for receiving the driving force, and driven side abutment portion to be abutted by the driving side abutment portion, the driving force driven coupling member being slidable in a predetermined direction which is substantially parallel with a rotational axis of the driven coupling member;

wherein at least one of the driving force transmitting portion and the driving force receiving portion is inclined such that when the driving force transmitting portion transmits the driving force to the driving force receiving portion, the driving coupling member and the driven coupling member attract to each other, and at least one of the driving side abutment portion and the driven side abutment portion is inclined such that the driven coupling member retracts away from the driving coupling member in the predetermined direction by a force received by the driven side abutment portion from the driving side abutment portion with dismounting of the cartridge.

According to another aspect of the present invention, there is provided a cartridge for a main assembly of an electrophotographic image forming apparatus, wherein the main assembly includes a rotatable driving coupling member including a driving force transmitting portion for transmitting a driving force and a driving side abutment portion, wherein the cartridge is demountable in a direction substantially perpendicular to a rotational axis of the driving coupling member, comprising:

a rotatable driven coupling member including a driving force receiving portion for receiving the driving force, and a driven side abutment portion to be abutted by the driving side abutment portion, the driving force driven coupling member being slidable in a predetermined direction which is substantially parallel with a rotational axis of the driven coupling member;

wherein the driving force transmitting portion and the driving force receiving portion are configured and positioned such that when the driving force transmitting portion transmits the driving force to the driving force receiving portion, the rotational axis the driving coupling member is substantially aligned with the rotational axis of the driven coupling member, at least one of the driving side abutment portion and the driven side abutment portion is inclined such that the driven coupling member retracts away from the driving coupling member in the predetermined direction by a force received by the driven side abutment portion from the driving side abutment portion with dismounting of the cartridge.

According to another aspect of the present invention, there is provided an electrophotographic image forming apparatus comprising:

a rotatable driving coupling member including a driving force transmitting portion for transmitting a driving force and a driving side abutment portion;

a cartridge demountable in a direction substantially perpendicular to a rotational axis of the driving coupling member, the cartridge including a rotatable driven coupling member including a driving force receiving portion for receiving the driving force, and a driven side abutment portion to be abutted by the driving side abutment portion, the driving force driven coupling member being slidable in a predetermined direction which is substantially parallel with a rotational axis of the driven coupling member;

wherein at least one of the driving side abutment portion and the driven side abutment portion is inclined so that the driven coupling member is retractable away from the driving coupling member in the predetermined direction by a force received by driven side abutment portion from the driving side abutment portion, and wherein a distance between the rotational axis of the driven coupling member and the abutment portion of the receiving abutment portion is not more than a distance between the rotational axis of the driven coupling member and the driving force receiving portion.

According to a further aspect of the present invention, there is provided an electrophotographic image forming apparatus comprising:

a rotatable driving coupling member including a driving force transmitting portion for transmitting a driving force and a driving side abutment portion;

a cartridge demountable in a direction substantially perpendicular to a rotational axis of the driving coupling member, the cartridge including a rotatable driven coupling member including a driving force receiving portion for receiving the driving force, and driven side abutment portion to be abutted by the driving side abutment portion, the driving force driven coupling member being slidable in a predetermined direction which is substantially parallel with a rotational axis of the driven coupling member;

wherein at least one of the driving force transmitting portion and the driving force receiving portion is inclined such that when the driving force transmitting portion transmits the driving force to the driving force receiving portion, the driving coupling member and the driven coupling member attract to each other, and at least one of the driving side abutment portion and the driven side abutment portion is inclined such that the driven coupling member retracts away from the driving coupling member in the predetermined direction by a force received by the driven side abutment portion from the driving side abutment portion with dismounting of the cartridge.

According to a still further aspect of the present invention, there is provided an electrophotographic image forming apparatus comprising:

a rotatable driving coupling member including a driving force transmitting portion for transmitting a driving force and a driving side abutment portion;

a cartridge demountable in a direction substantially perpendicular to a rotational axis of the driving coupling member, the cartridge including a rotatable driven coupling member including a driving force receiving portion for receiving the driving force, and driven side abutment portion to be abutted by the driving side abutment portion, the driving force driven coupling member being slidable in a predetermined direction which is substantially parallel with a rotational axis of the driven coupling member;

wherein the driving force transmitting portion and the driving force receiving portion are configured and positioned such that when the driving force transmitting portion transmits the driving force to the driving force receiving portion, the rotational axis the driving coupling member is substantially aligned with the rotational axis of the driven coupling member, at least one of the driving side abutment portion and the driven side abutment portion is inclined such that the driven coupling member retracts away from the driving coupling member in the predetermined direction by a force received by the driven side abutment portion from the driving side abutment portion with dismounting of the cartridge.

at least one of the driving side abutment portion and the driven side abutment portion is inclined such that the driven coupling member retracts away from the driving coupling member in the predetermined direction by a force received by the driven side abutment portion from the driving side abutment portion with dismounting of the cartridge.

According to the present invention, it is possible to provide the cartridge demountable from the apparatus main assembly which is not provided with the mechanism for moving the apparatus main assembly-side cartridge member, for transmitting a rotatable force to the cartridge, in the axial direction of the cartridge member.

These and other objects, features and advantages of the present invention will become more apparent upon a consideration of the following description of the preferred embodiments of the present invention taken in conjunction with the accompanying drawings.

Figure 7:
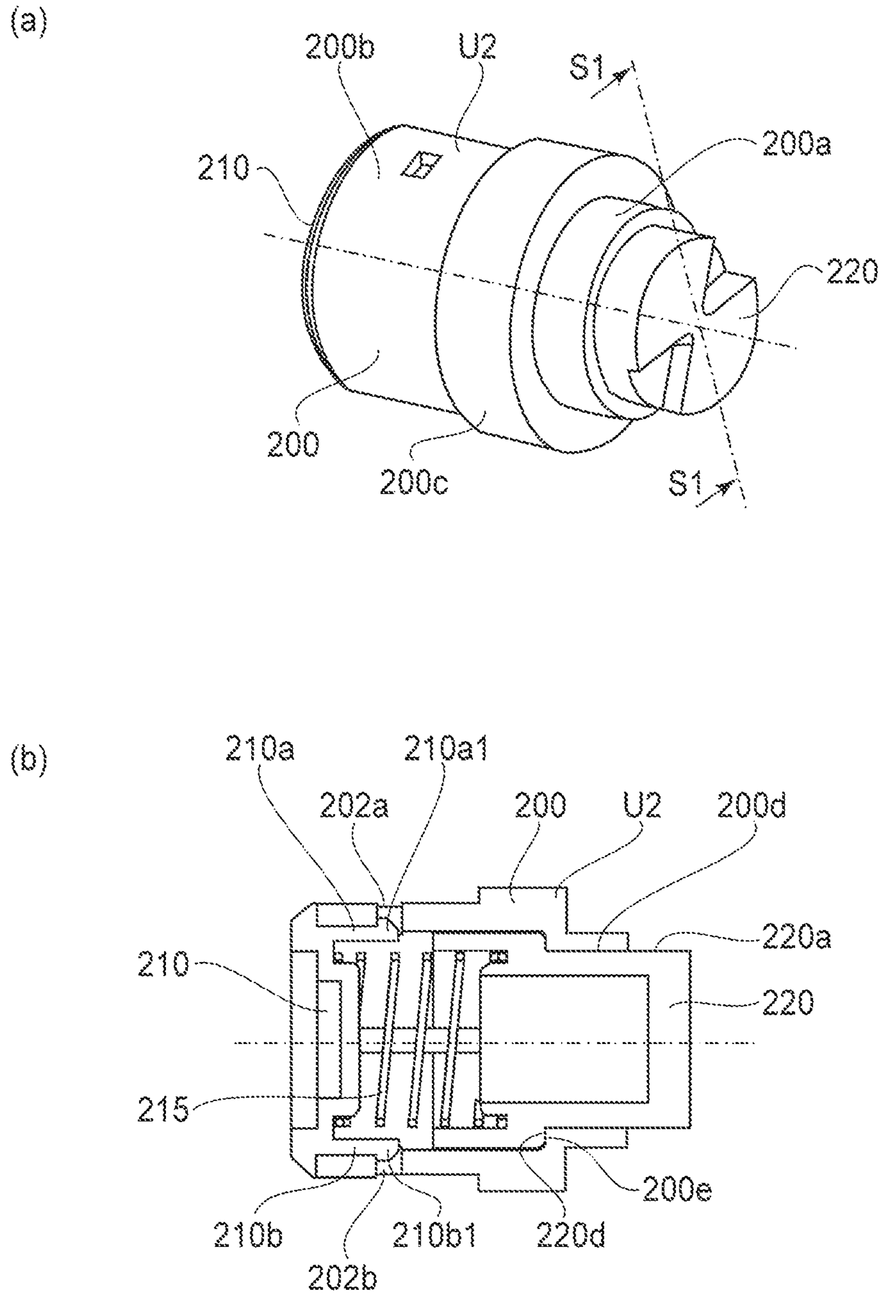
Figure 8:
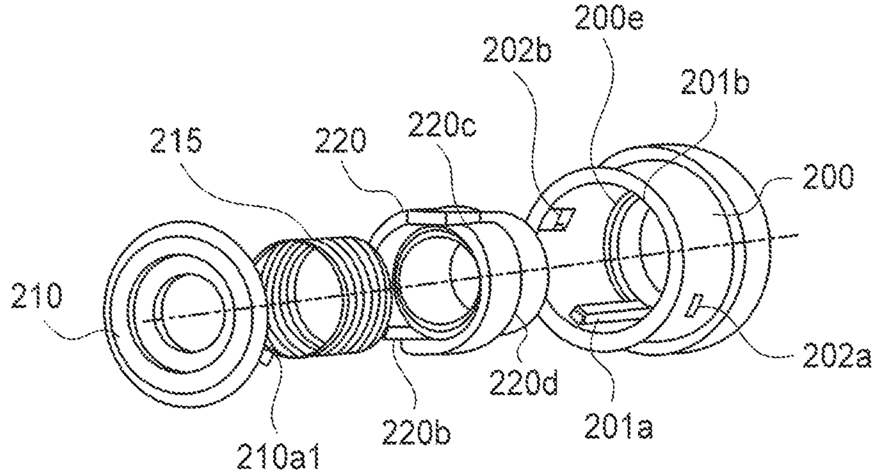
Figure 8:
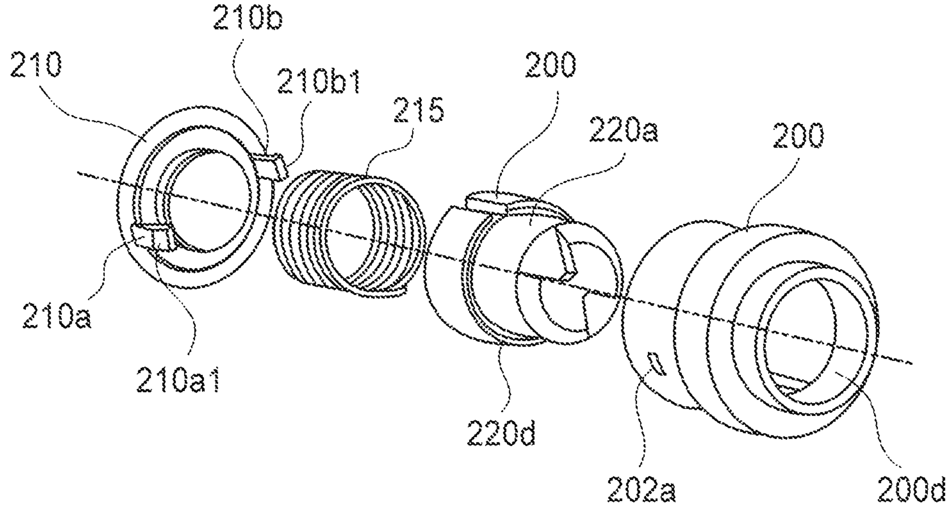

Parts (a) and (b) of FIG. 7 and Parts (a) and (b) of FIG. 8 are illustrations of a coupling unit.

Figure 9:
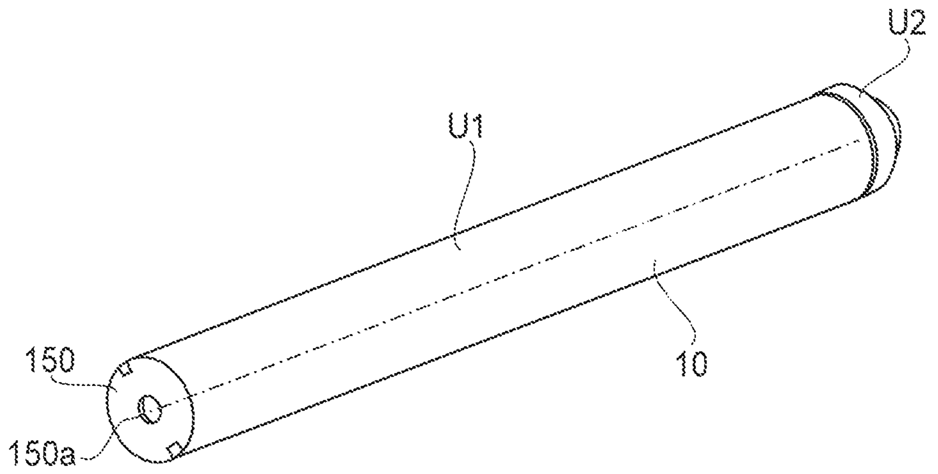
Figure 9:
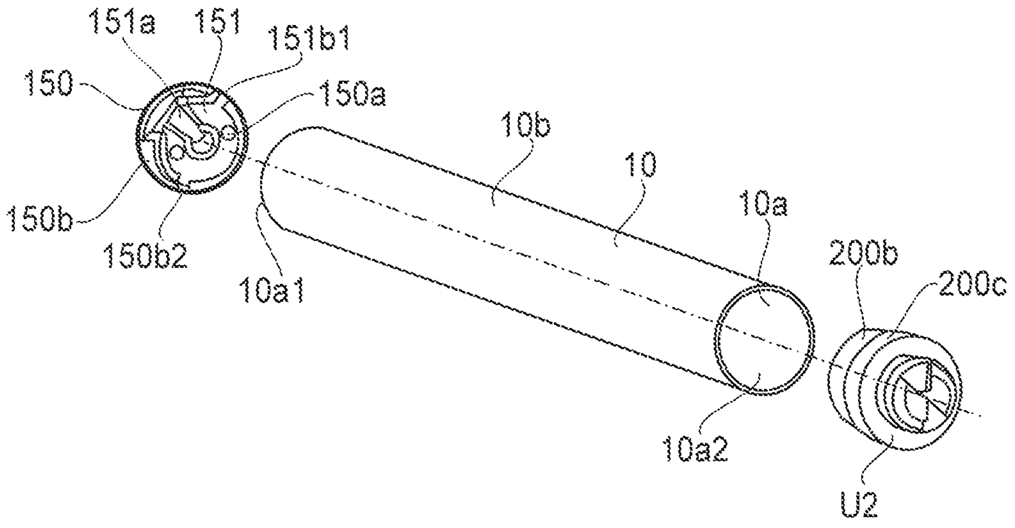

Parts (a) and (b) of FIG. 9 are illustrations of a drum unit.

Figure 10:
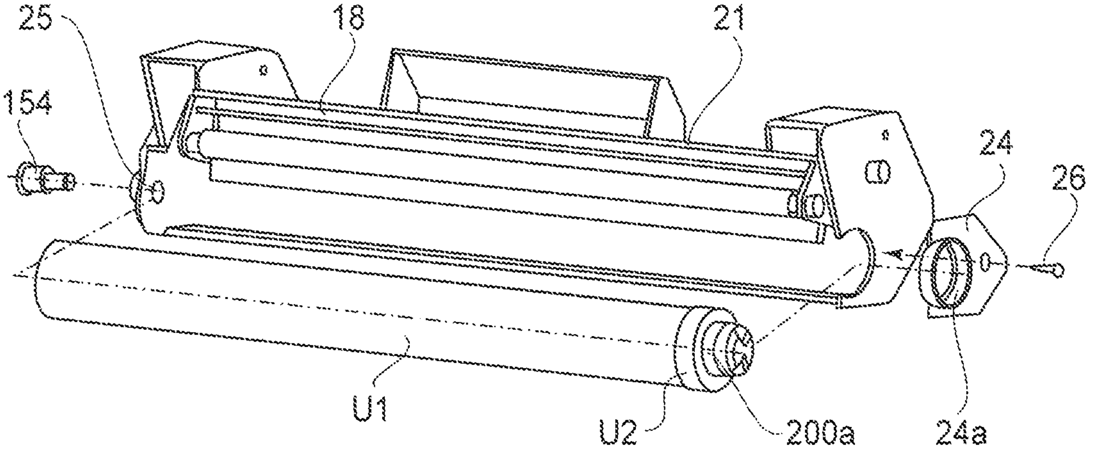

FIG. 10 is an illustration of mounting of the drum unit.

Figure 11:
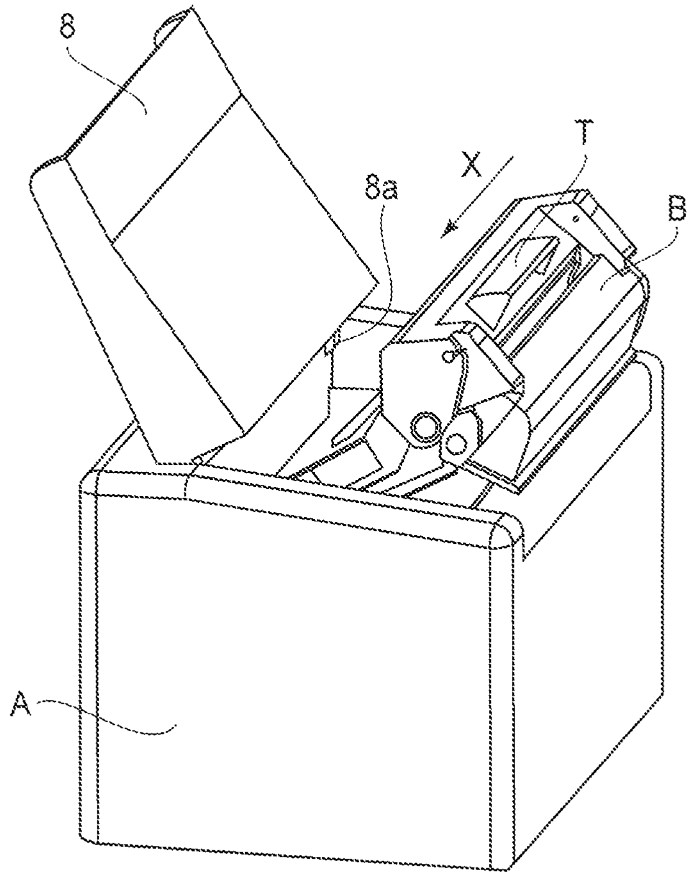
Figure 12:
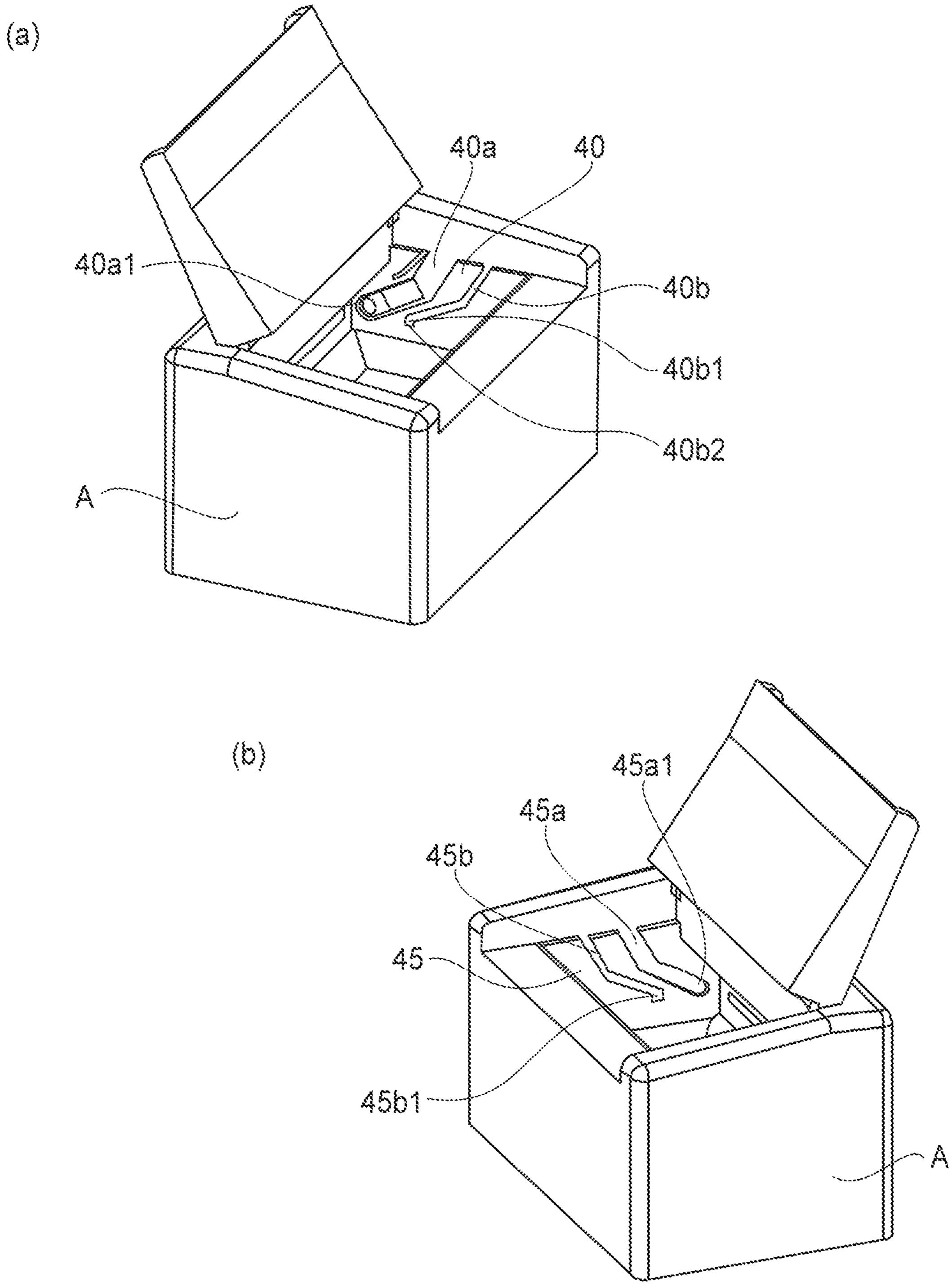
Figure 14:
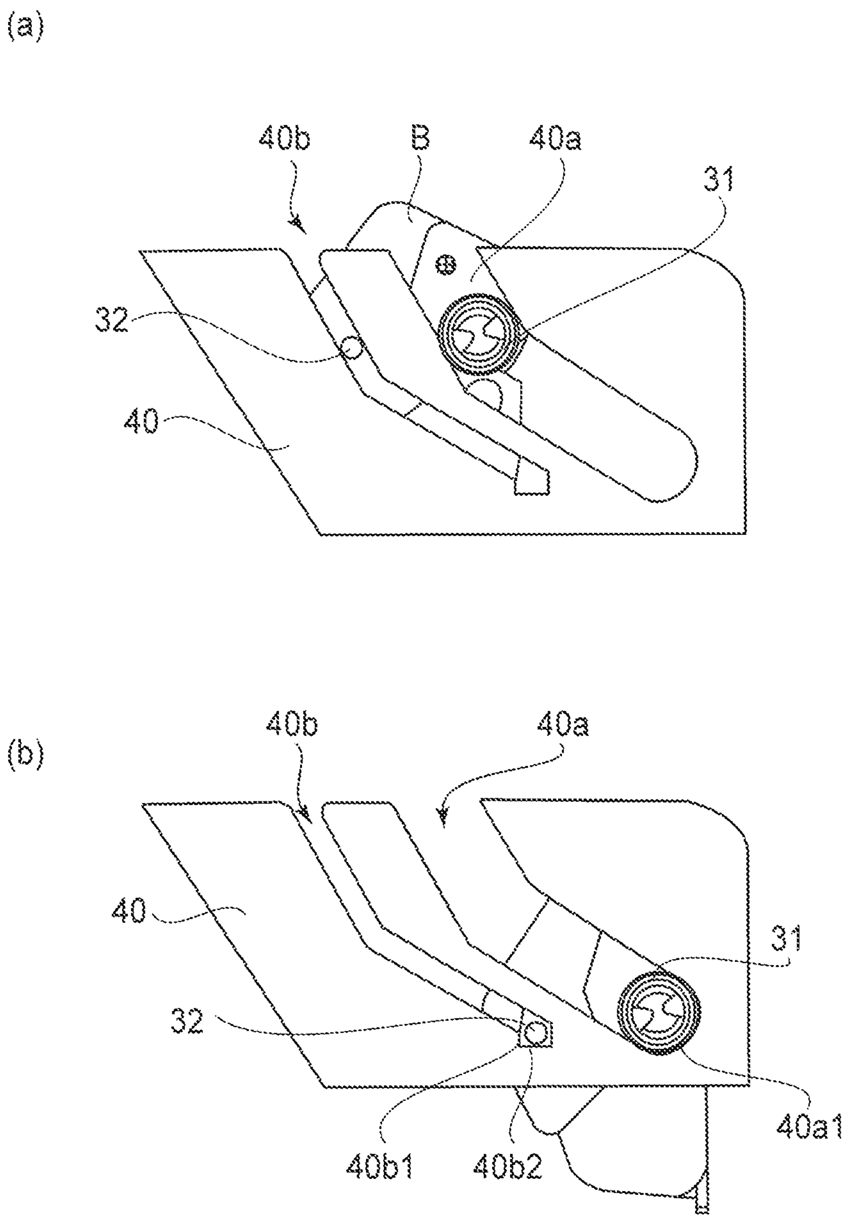
Figure 15:
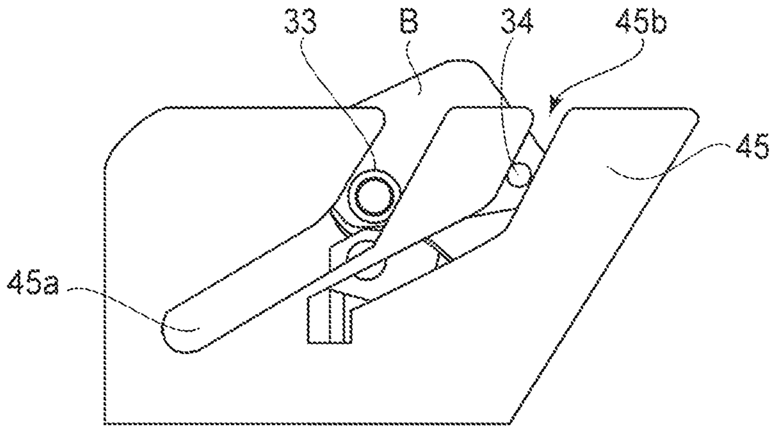
Figure 15:
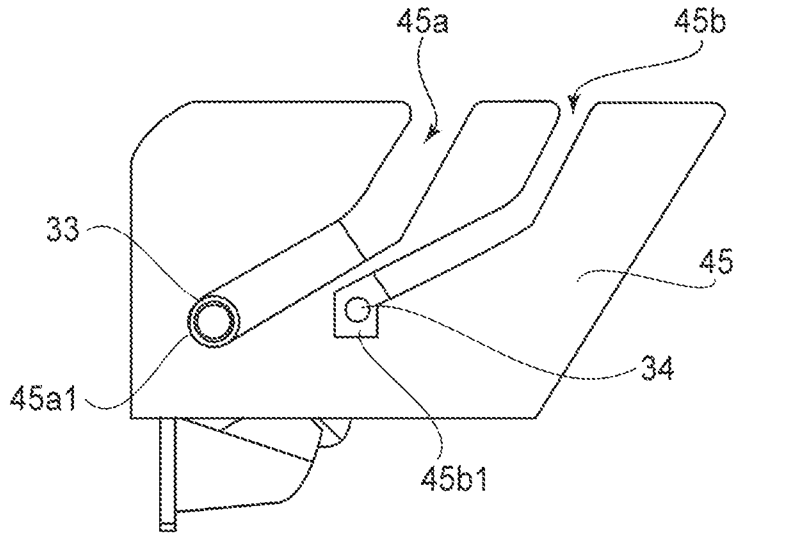

FIG. 11, Parts (a) and (b) of FIG. 12, Parts (a) and (b) of FIG. (13), Parts (a) and (b) of FIG. 14, and Parts (a) and (b) of FIG. 15 are illustrations of mounting of the cartridge.

Figure 16:
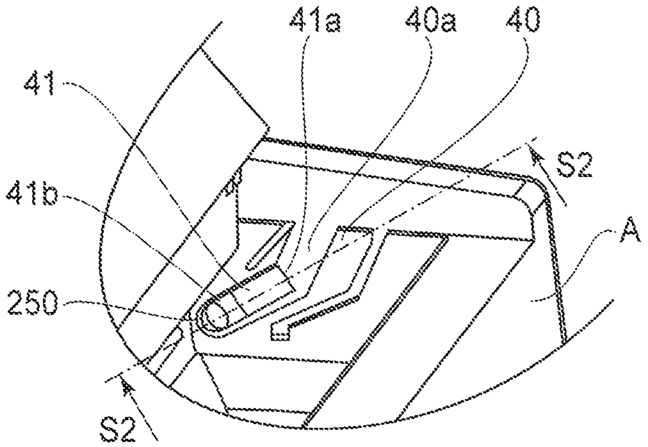

FIG. 16 is an illustration of an apparatus main assembly guide portion.

Figure 17:
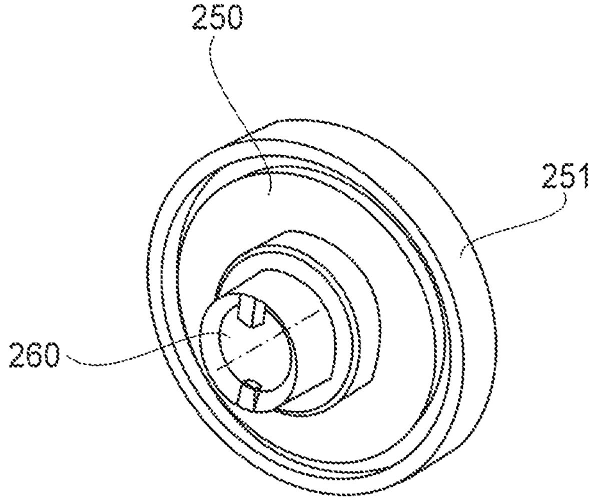

FIG. 17 is an illustration of a driving coupling member.

Figure 18:
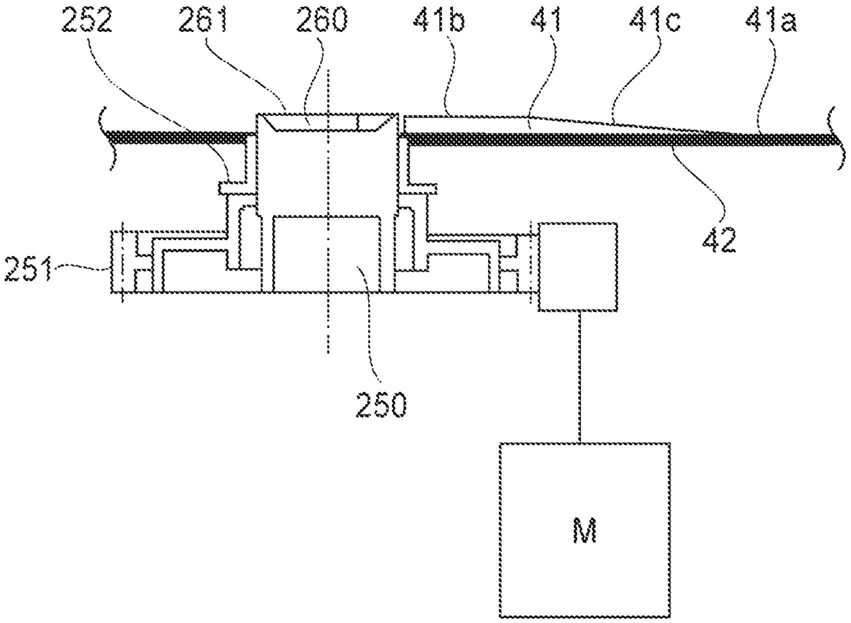

FIG. 18 is an illustration of mounting of the driving coupling member.

Figure 19:
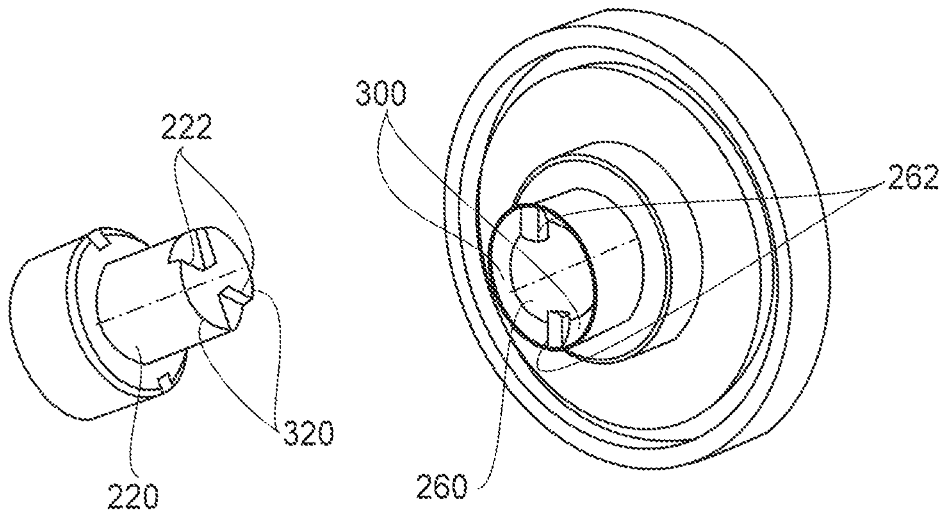
Figure 20:
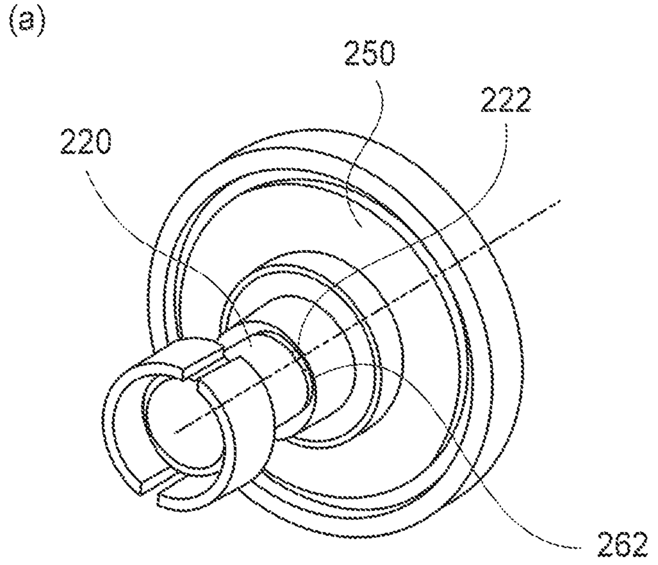
Figure 20:
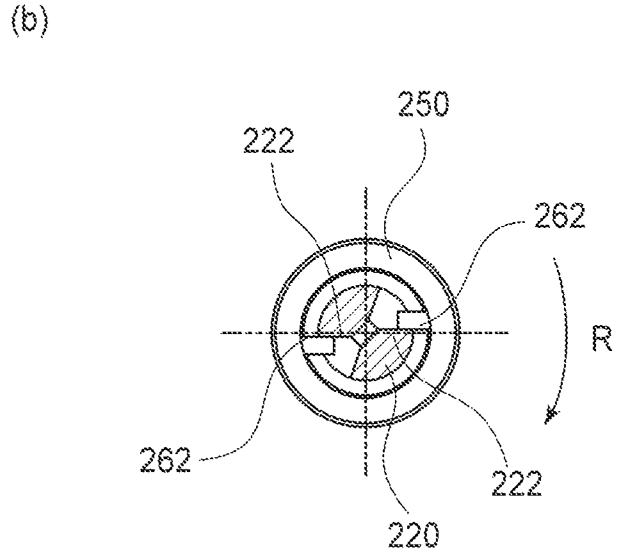

FIG. 19 and Parts (a) and (b) of FIG. 20 are illustrations of the driving coupling member and a driven coupling member.

Figure 21:
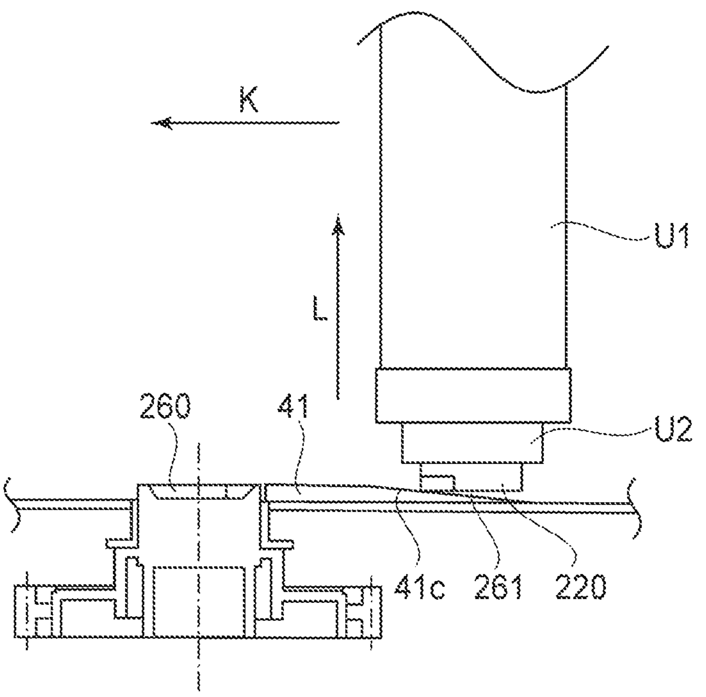
Figure 22:
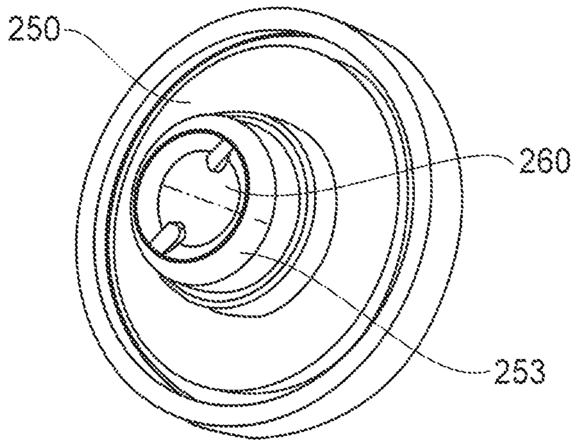
Figure 22:
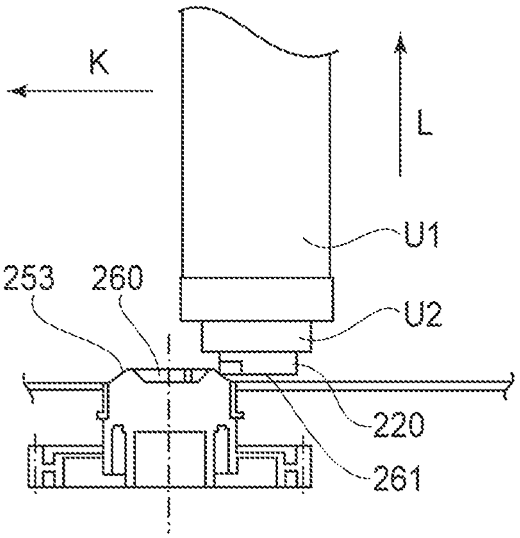

FIG. 21 and Parts (a) and (b) of FIG. 22 are illustrations of mounting of the cartridge.

Figure 23:
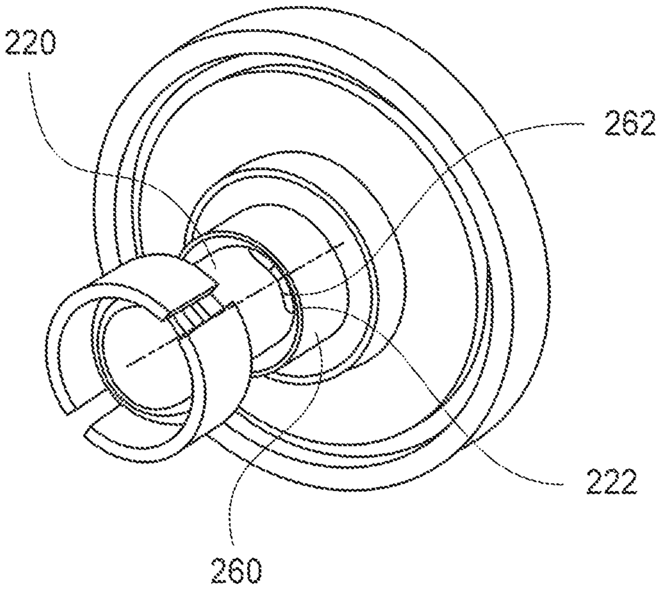
Figure 23:
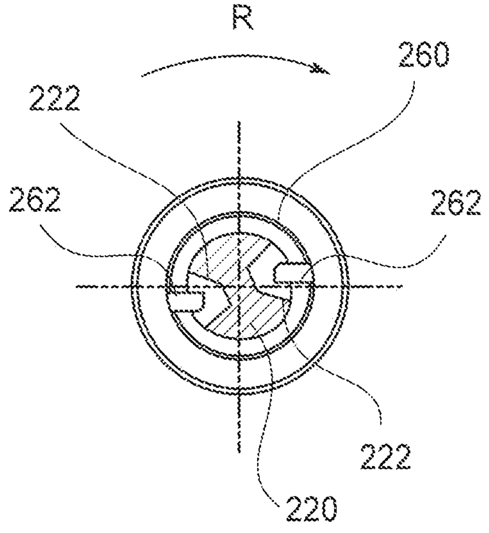
Figure 24:
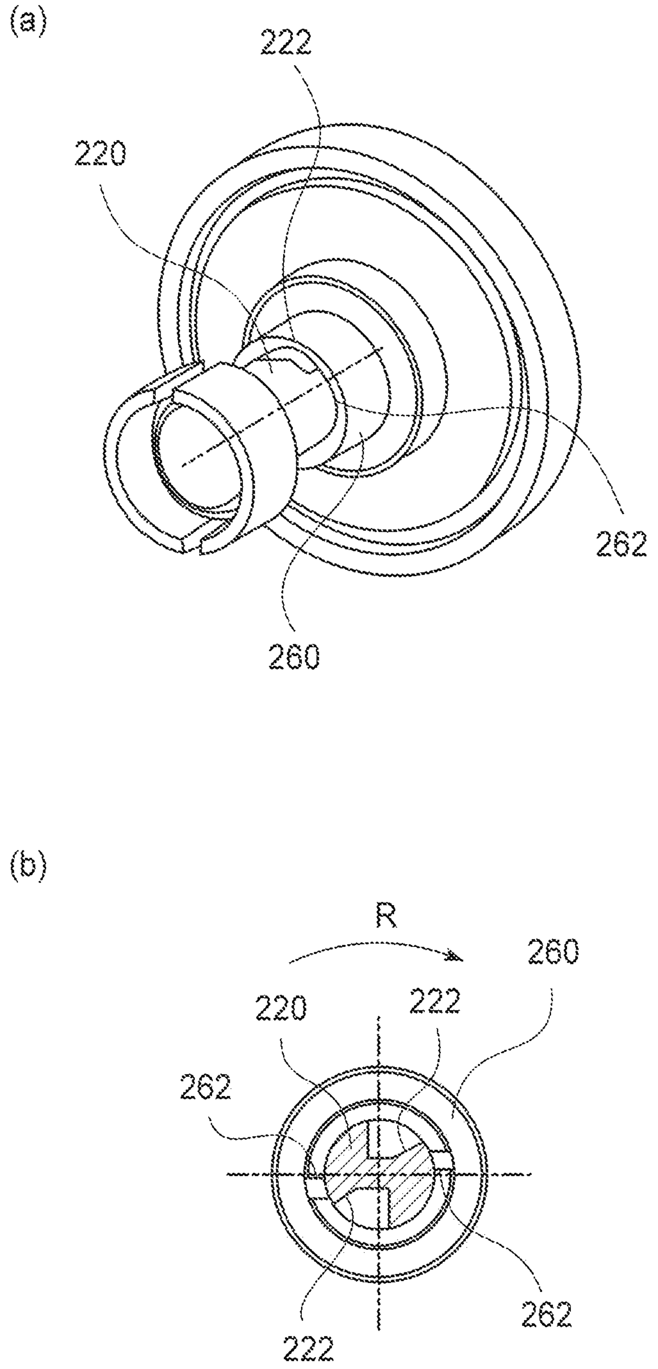

Parts (a) and (b) of FIG. 23 and Parts (a) and (b) of FIG. 24 are illustrations of the driving coupling member and the driven coupling member.

Figure 25:
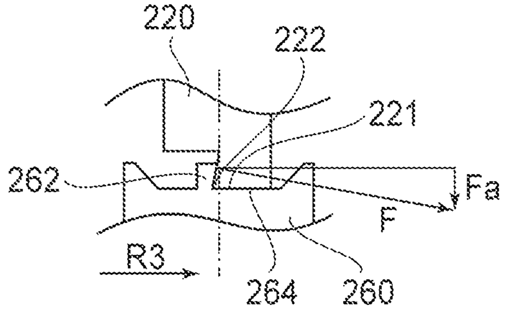
Figure 26:
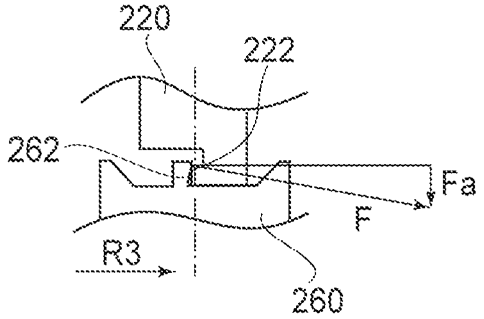
Figure 26:
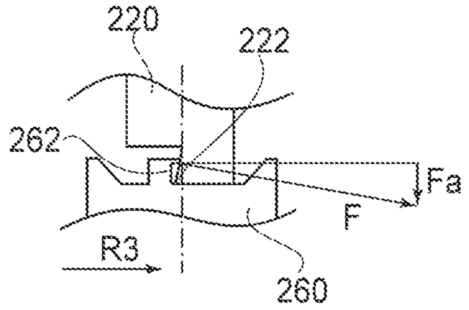

FIG. 25 and Parts (a) and (b) of FIG. 26 are illustrations of an attracting effect.

Figure 27:
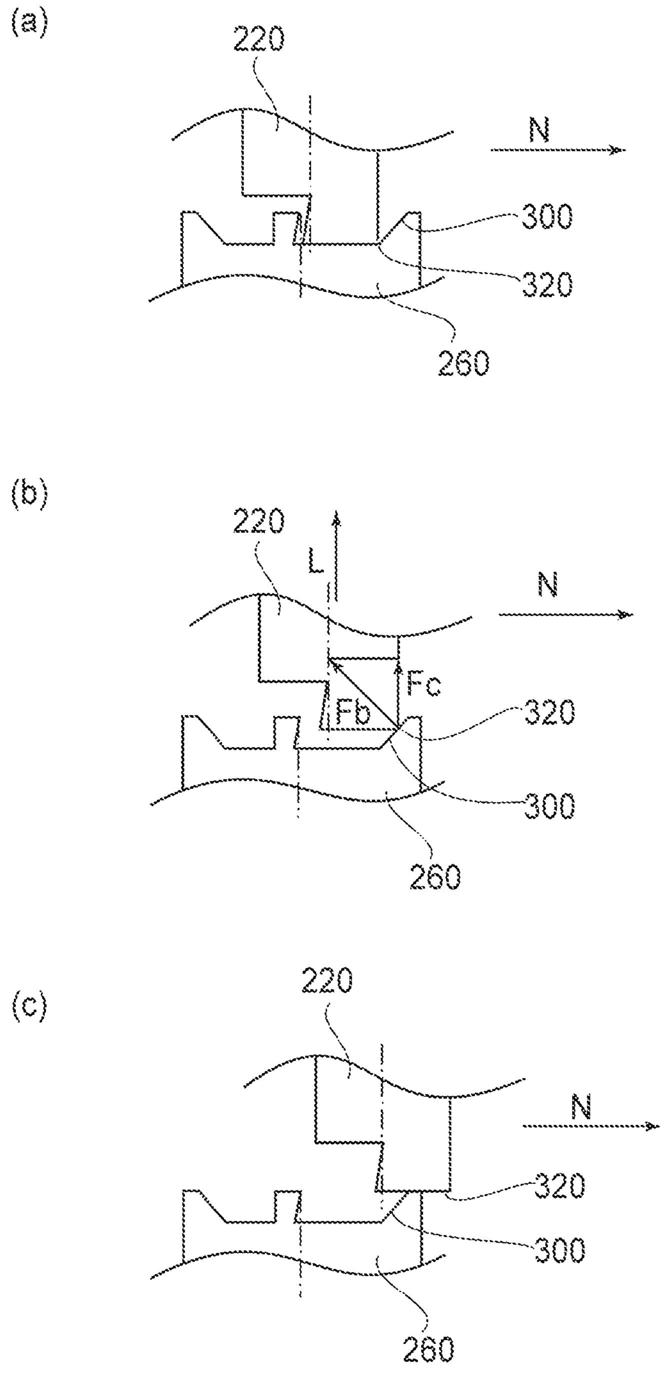
Figure 28:
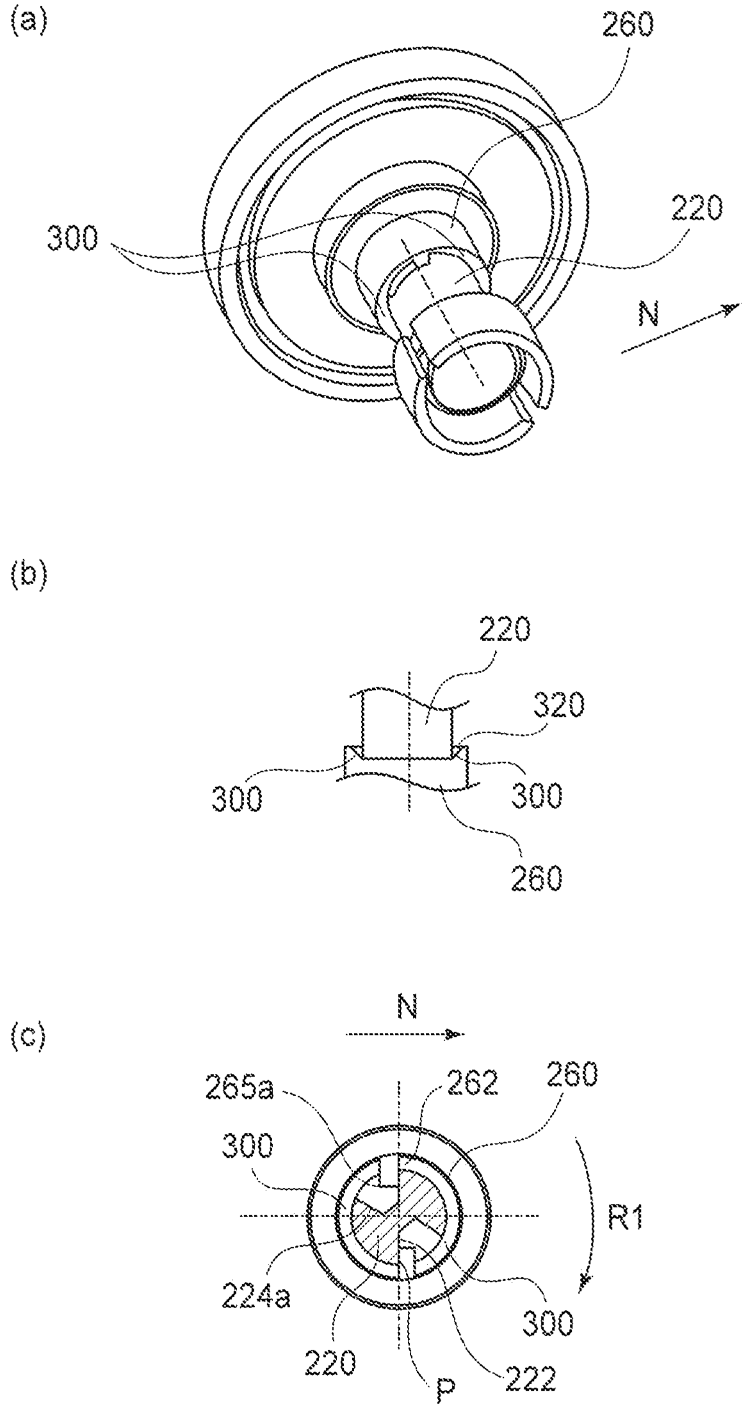
Figure 29:
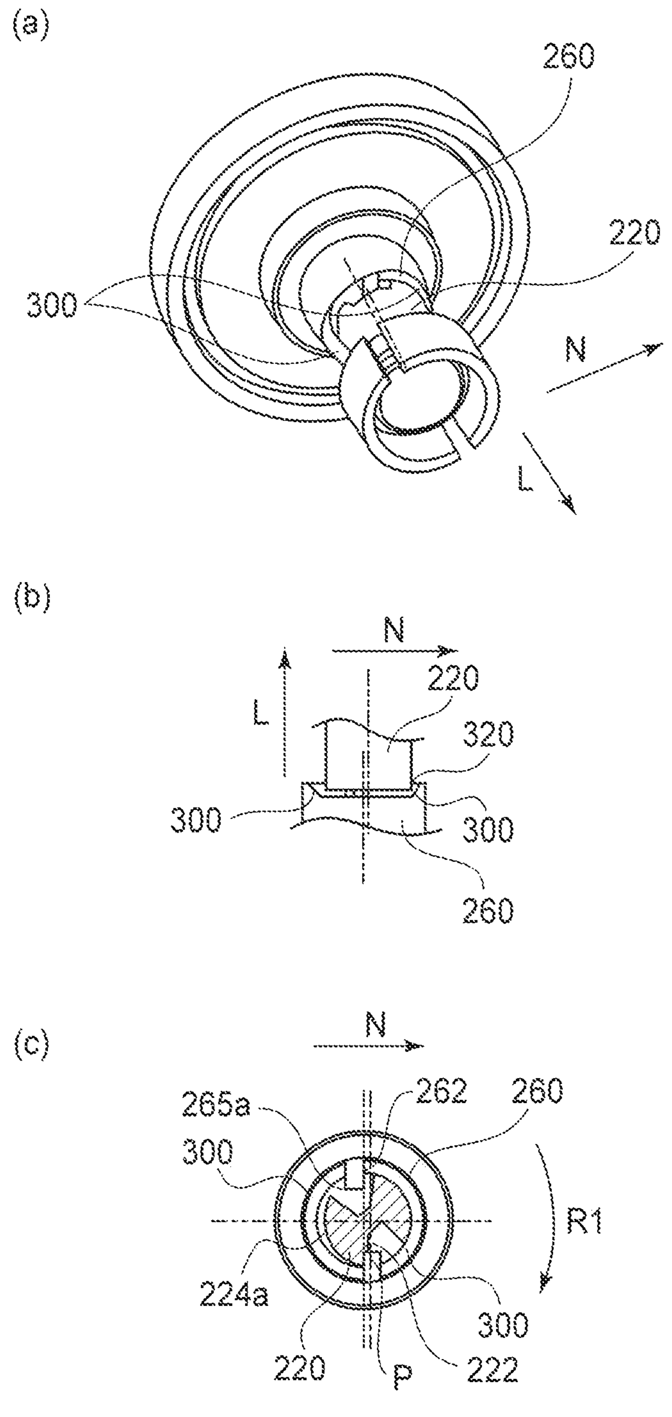
Figure 30:
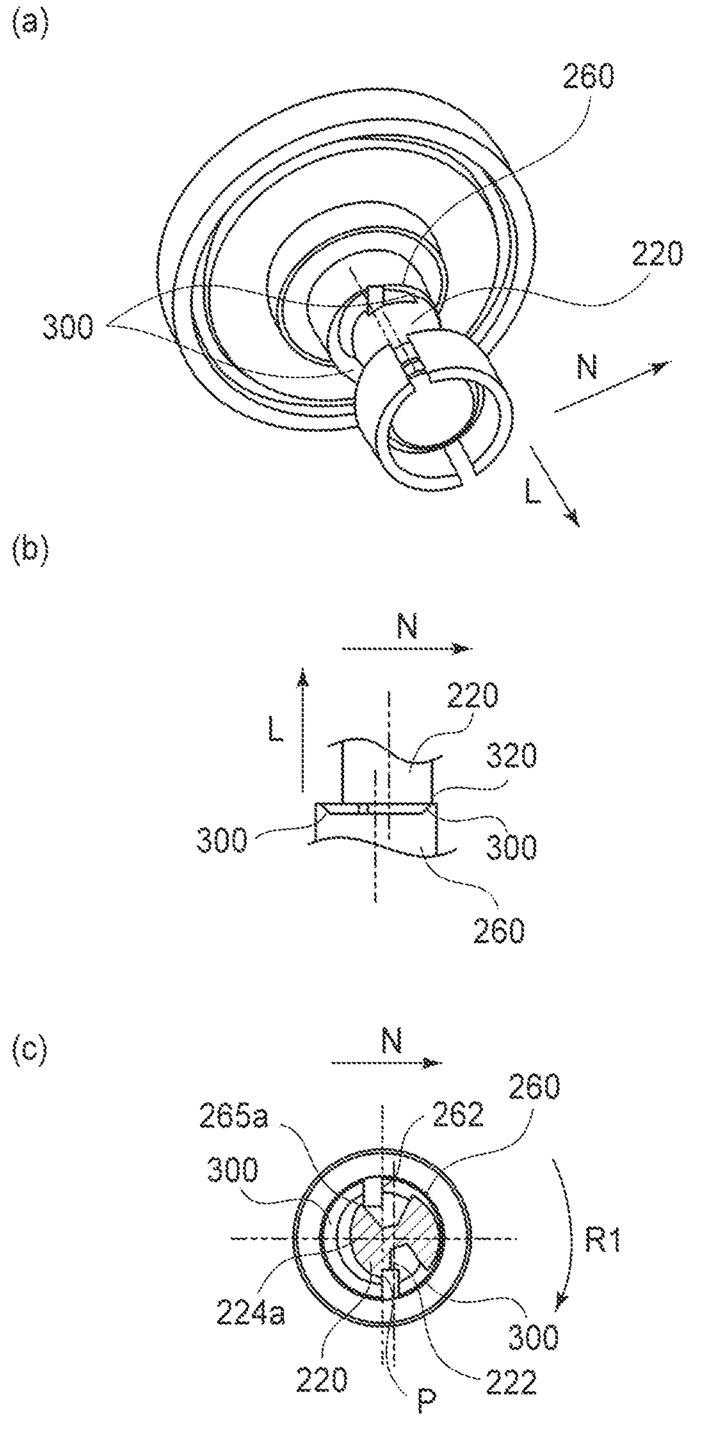
Figure 31:
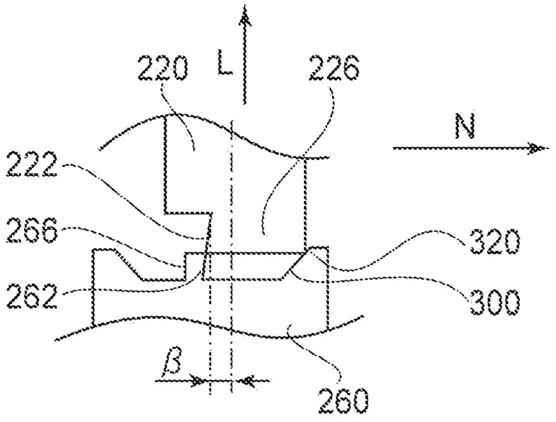
Figure 31:
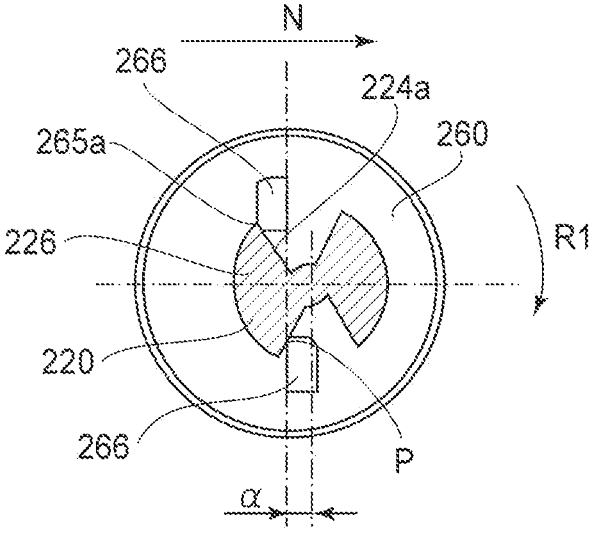
Figure 32:
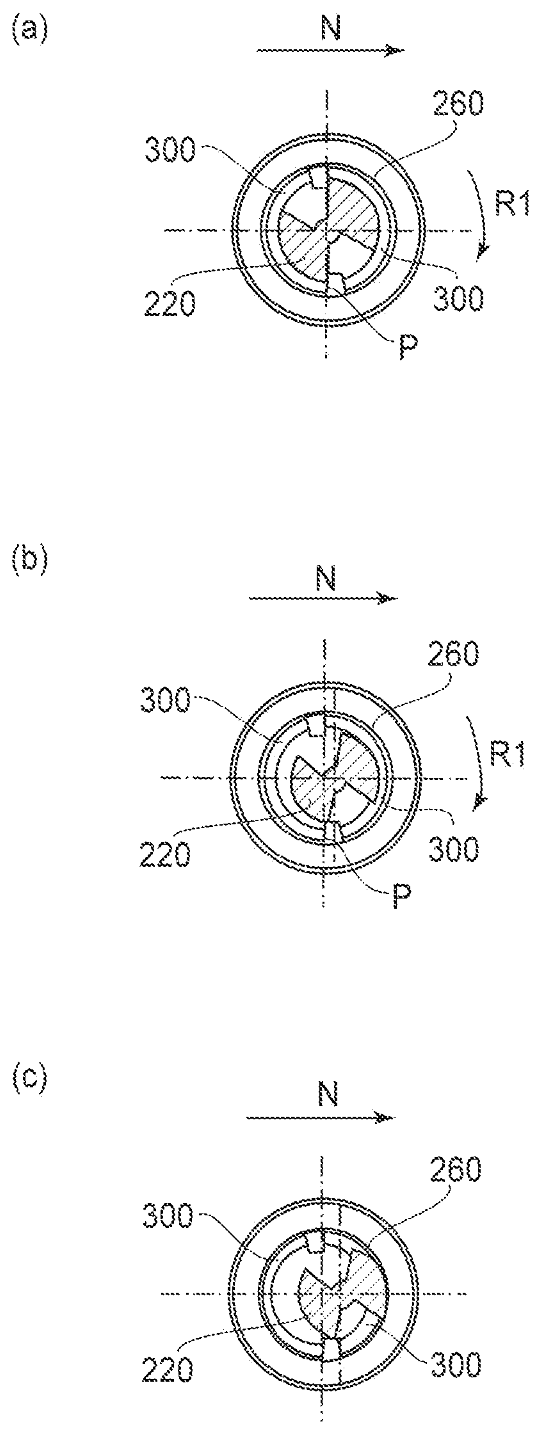

Parts (a)-(c) of FIG. 27, Parts (a)-(c) of FIG. 28, Parts (a)-(c) of FIG. 29, Parts (a)-(c) of FIG. 30, Parts (a) and (b) of FIG. 31, and Parts (a)-(c) of FIG. 32 are illustrations of a disengaging (releasing) operation.

Figure 33:
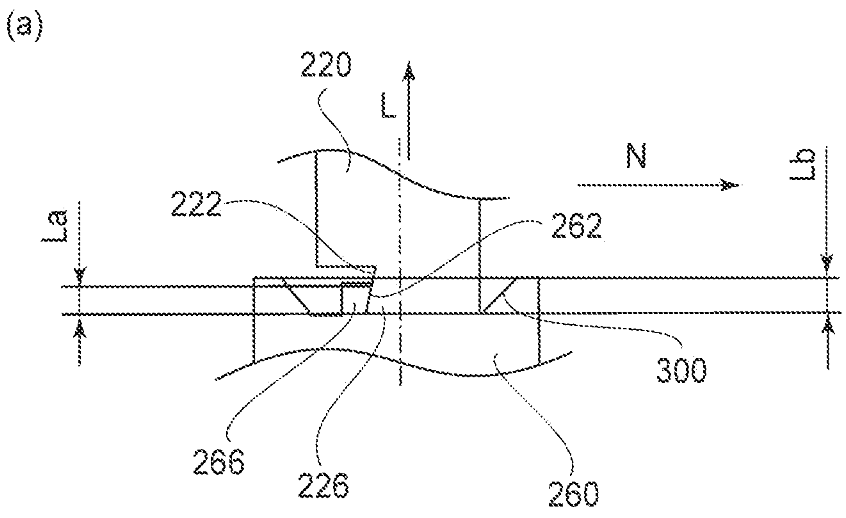
Figure 33:
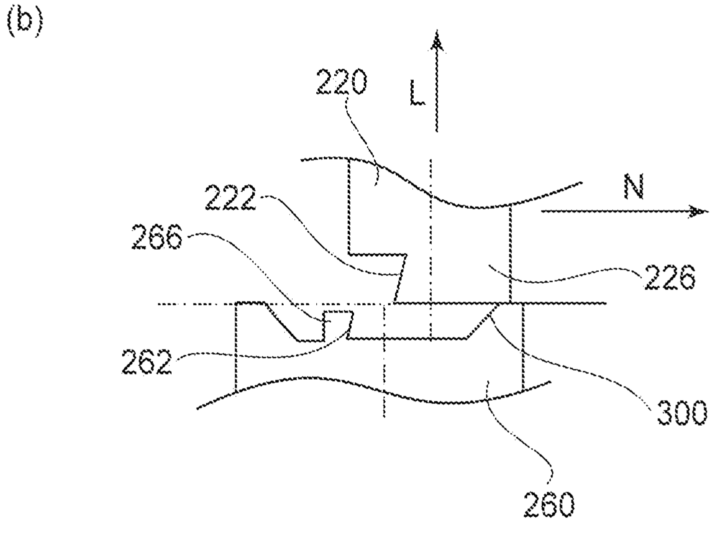
Figure 34:
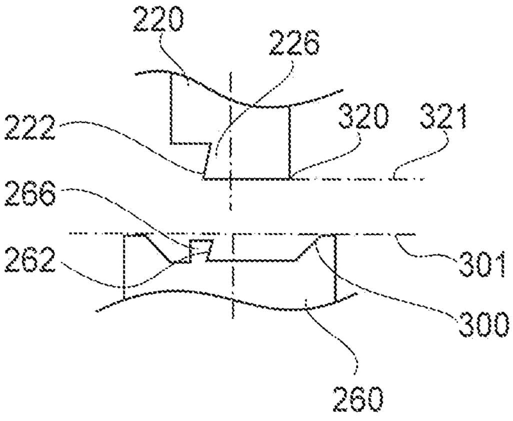

Parts (a) and (b) of FIGS. 33 and 34 are illustrations of an engaging portion.

Figure 35:
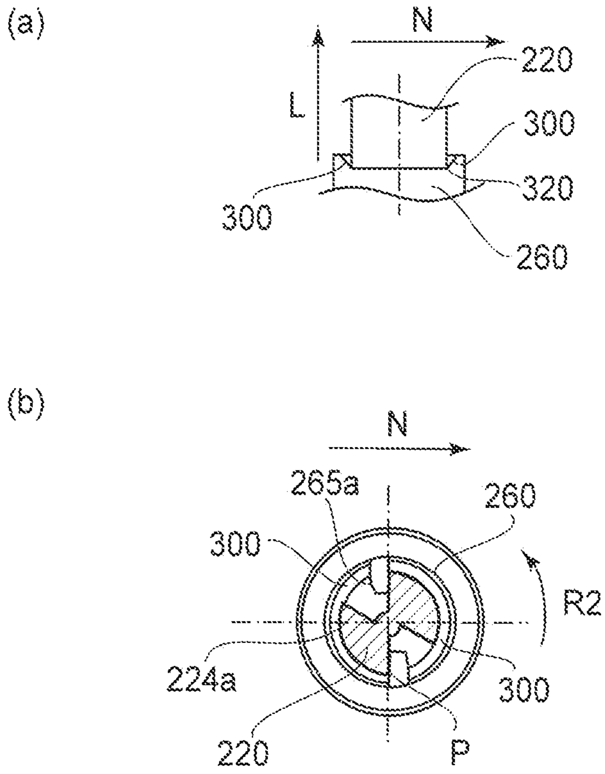
Figure 36:
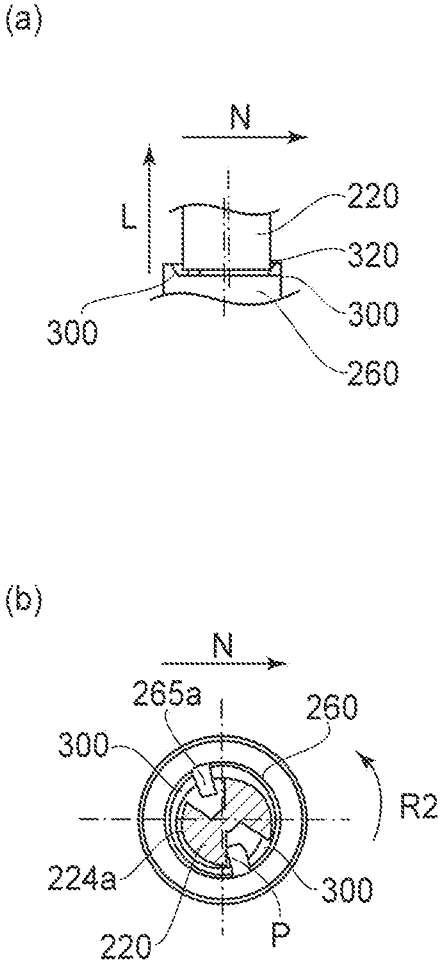
Figure 37:
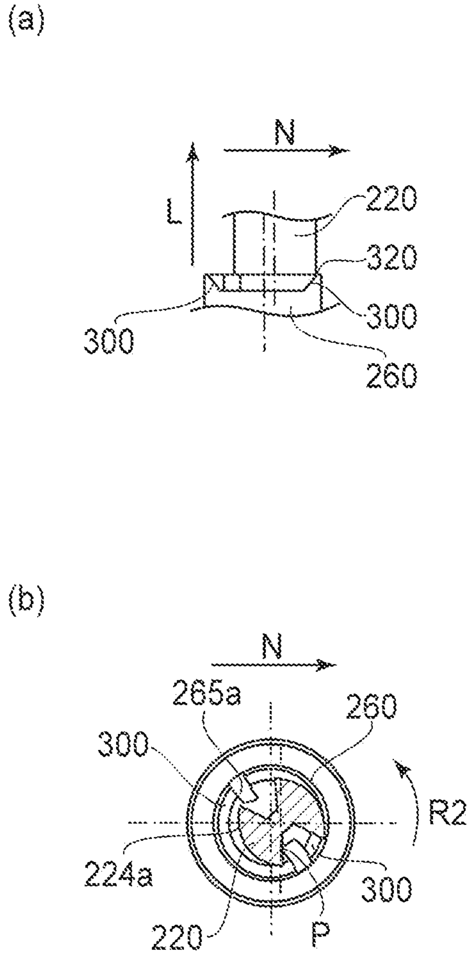
Figure 38:
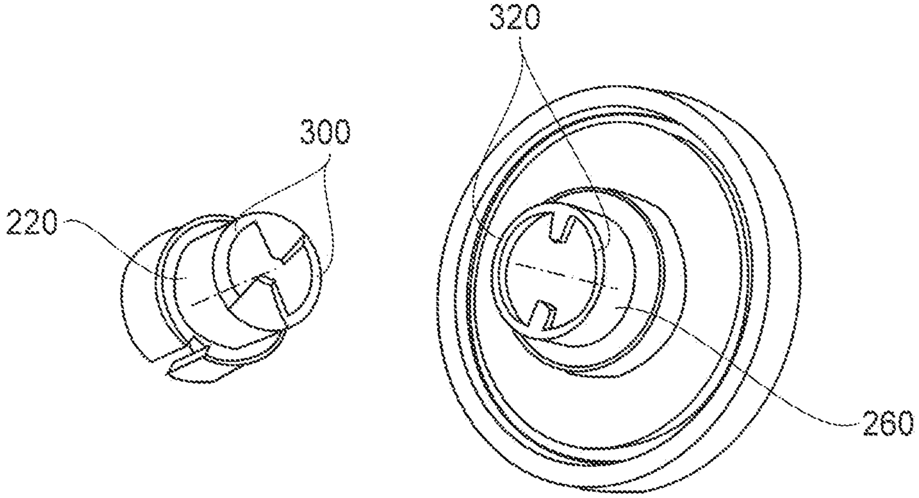
Figure 38:
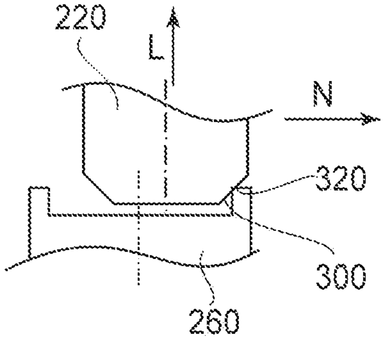
Figure 39:
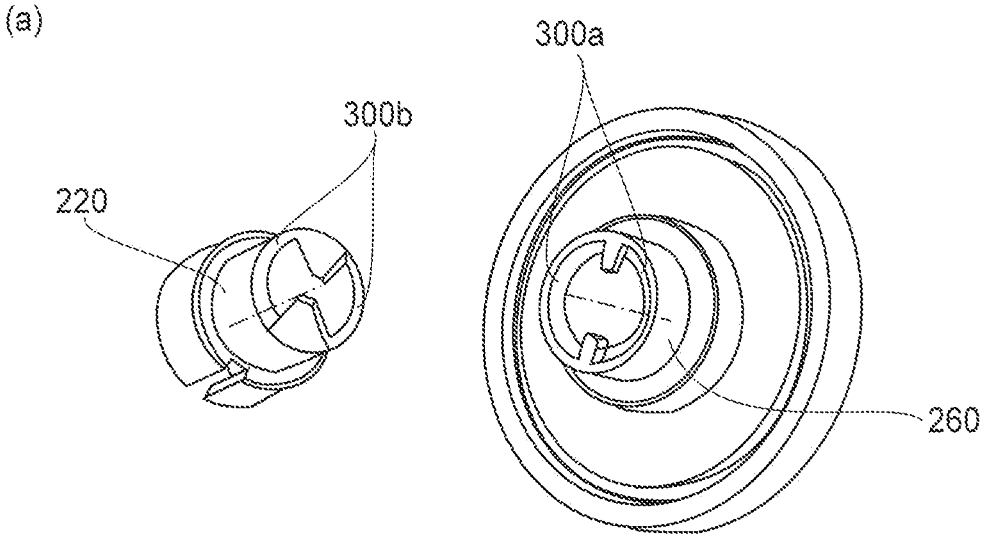
Figure 39:
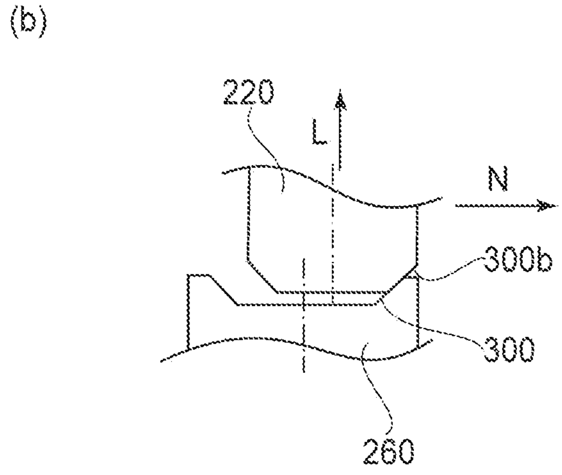

Parts (a) and (b) of FIG. 35, Parts (a) and (b) of FIG. 36, Parts (a) and (b) of FIG. 37, Parts (a) and (b) of FIG. 38, and Parts (a) and (b) of FIG. 39 are illustrations of the disengaging operation.

Figure 40:
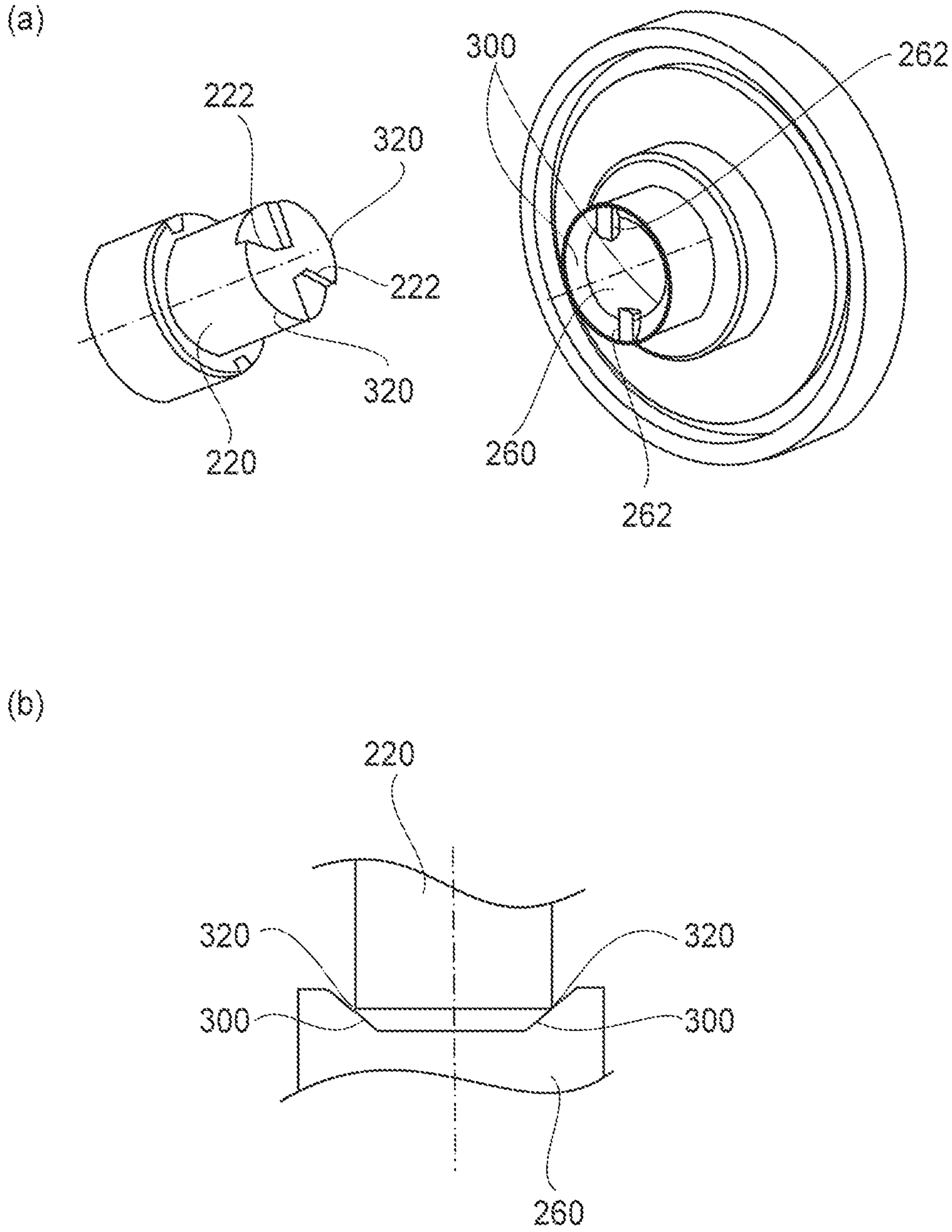
Figure 41:
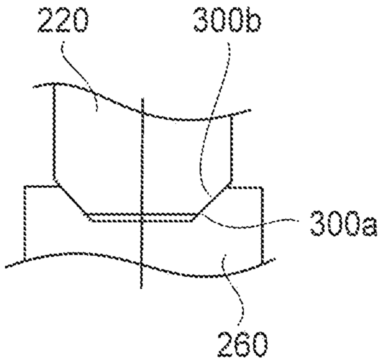

Parts (a) and (b) of FIG. 40 and FIG. 41 are illustrations of longitudinal positioning constitution.

Figure 43:
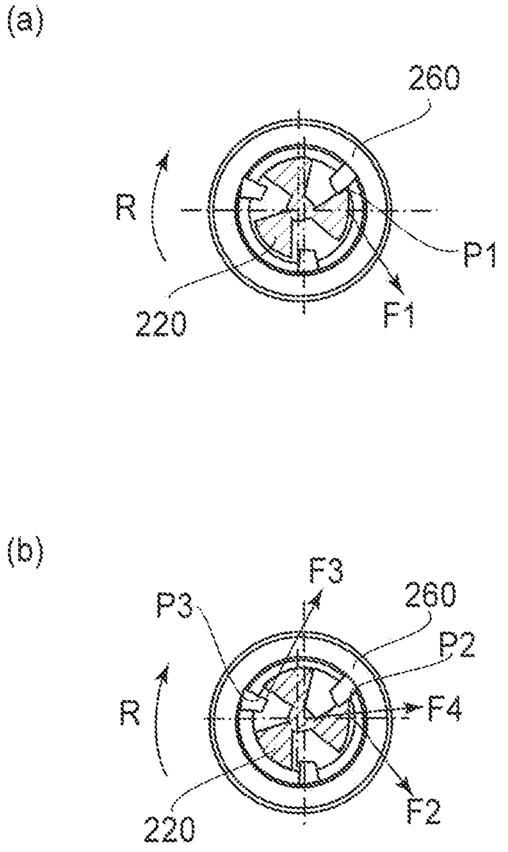
Figure 42:
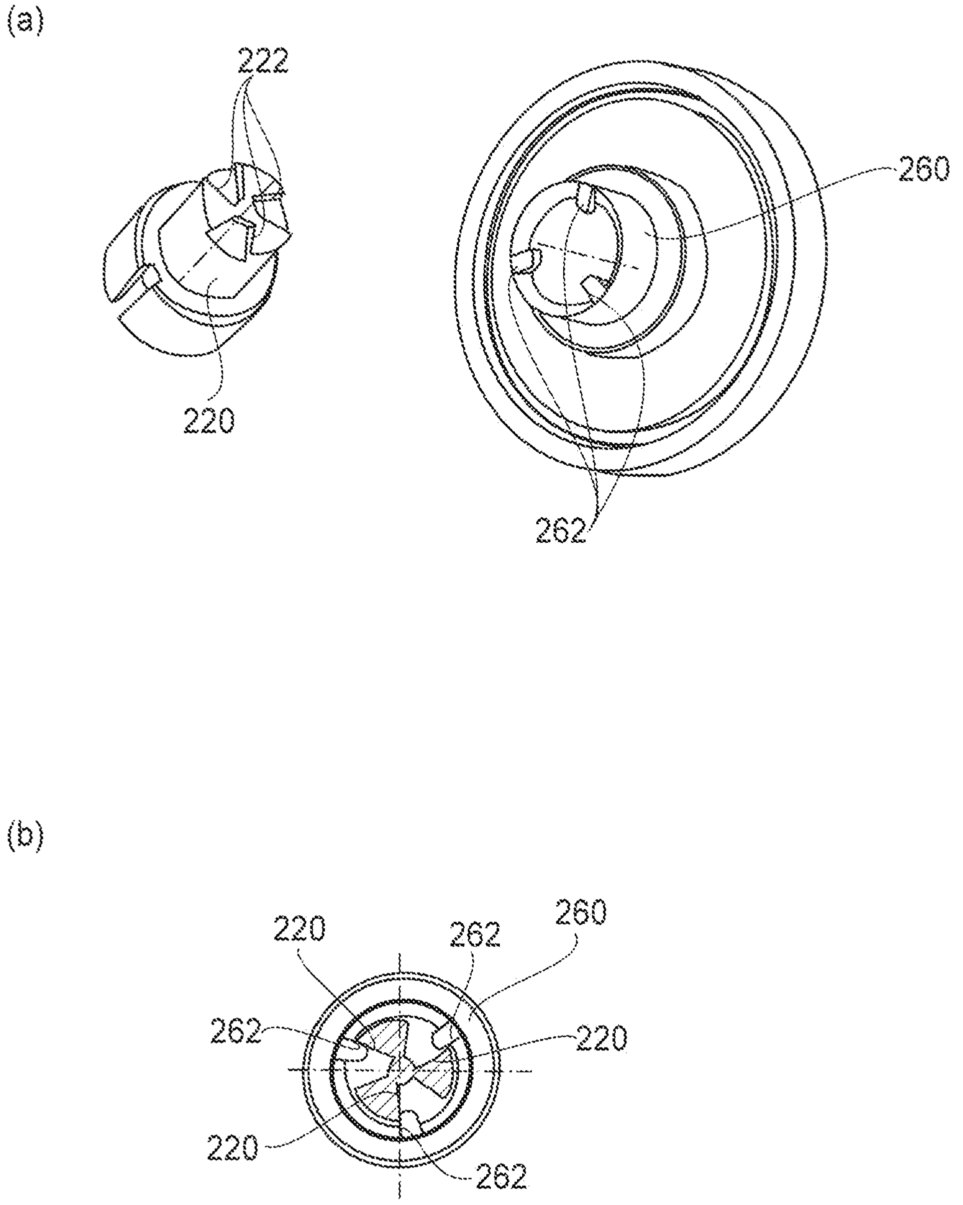

Parts (a) and (b) of FIG. 42 and Parts (a) and (b) of FIG. 43 are illustrations of cartridge rotational axis aligning constitution.

Figure 44:
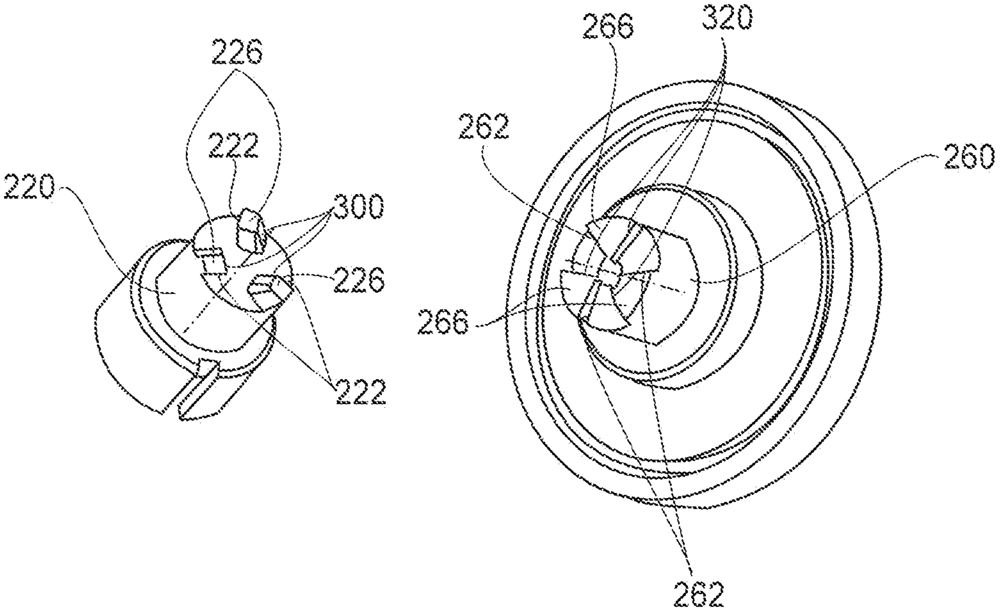
Figure 44:
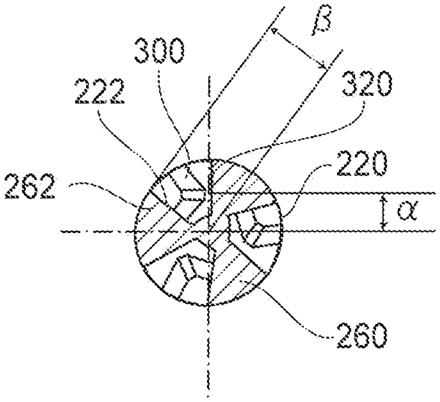

Parts (a) and (b) of FIG. 44 are illustrations of the driving coupling member and the driven coupling member.

Figure 45:
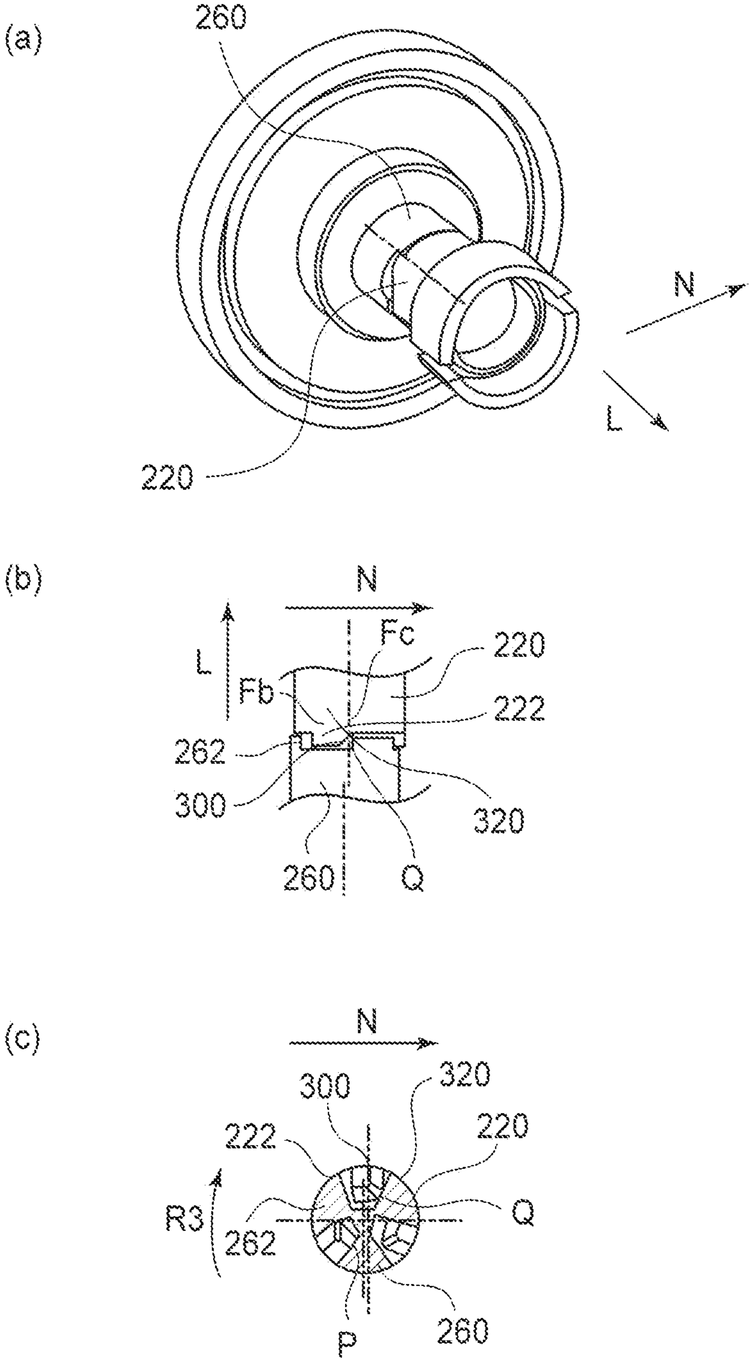
Figure 46:
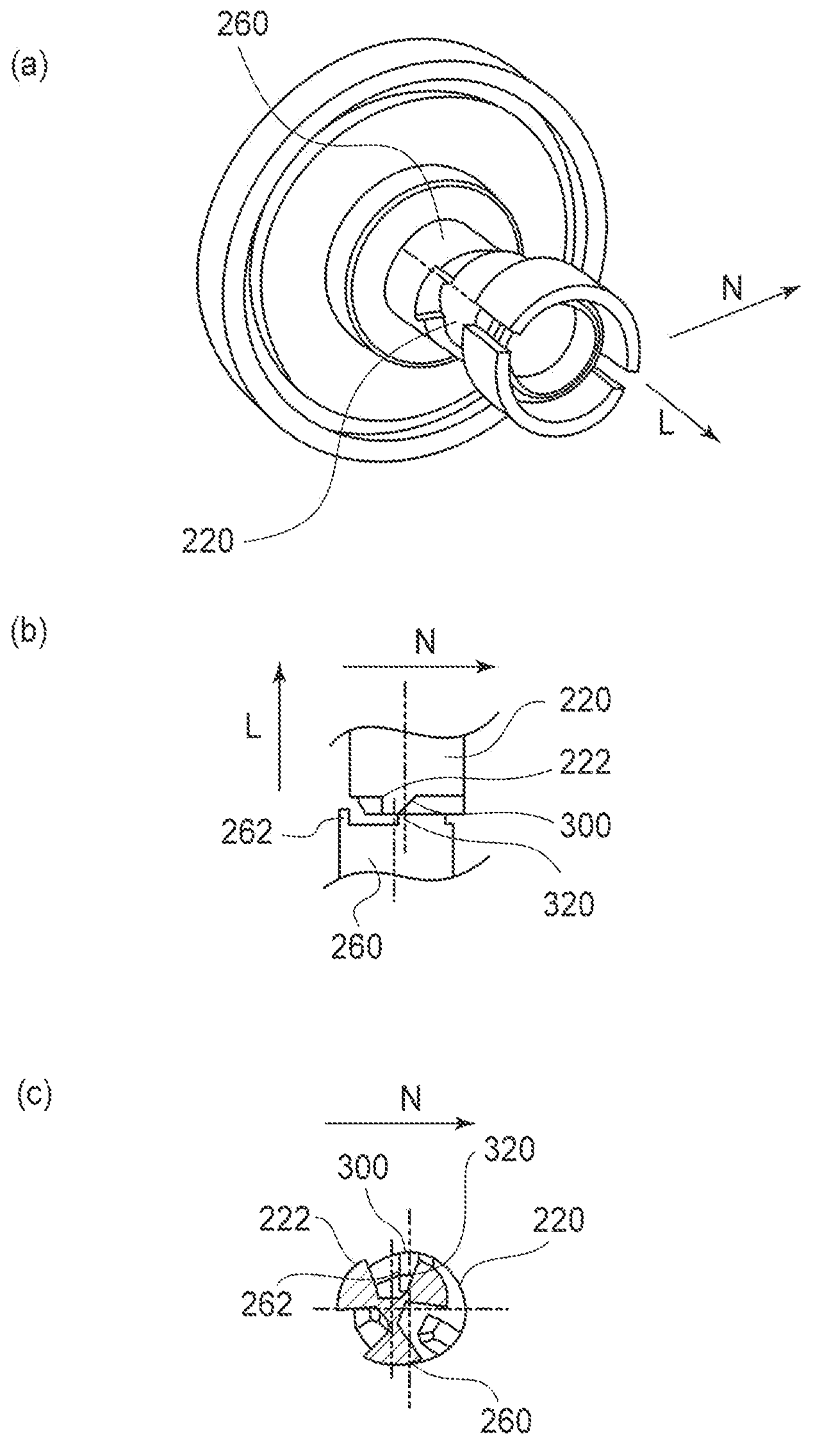

Parts (a)-(c) of FIG. 45 and Parts (a)-(c) of FIG. 46 are illustrations of the disengaging operation.

Figure 47:
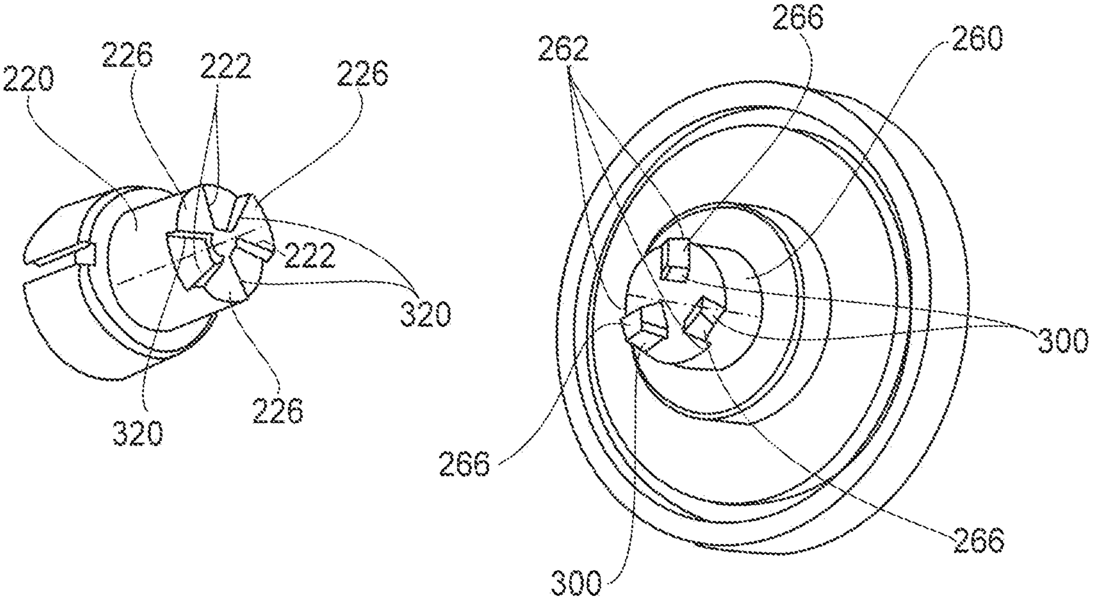

FIG. 47 is an illustration of the driving coupling member and the driven coupling member.

DESCRIPTION OF THE PREFERRED EMBODIMENTS

Embodiment 1

Embodiments to which the present invention is applied will be described with reference to FIGS. 1 to 47.

(Electrostatic Image Forming Apparatus)

Figure 1:
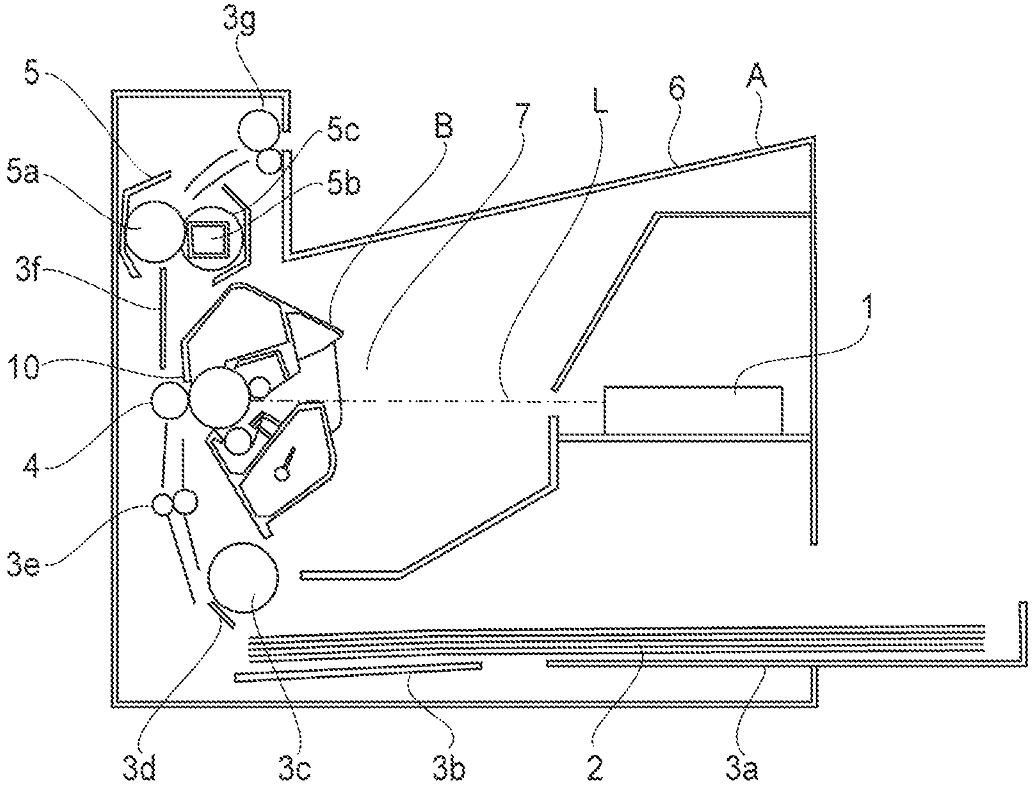
FIG. 1 is an illustration of a structure of an electrostatic image forming apparatus to which the present invention is applicable.

First, an electrostatic image forming apparatus (laser beam printer) to which a cartridge, to which the present invention is applicable, is detachably mountable will be described with reference to FIG. 1.

The electrostatic image forming apparatus is constituted by an electrostatic image forming apparatus main assembly A (hereinafter referred to as an apparatus main assembly A) and a cartridge B. The apparatus main assembly A forms, as shown in FIG. 1, an electrostatic latent image by irradiating the surface of a photosensitive drum 10 as a drum-shaped electrophotographic photosensitive member with laser light L, on the basis of image information, emitted from an optical system 1, and then forms a toner image by developing the electrostatic latent image with toner.

Then, in synchronism with the formation of the toner image, a lift-up plate 3*b* provided at an end of a sheet feeding tray 3*a* accommodating therein a recording material (medium) 2 is raised, so that the recording material 2 is conveyed by a conveying means including a conveying roller 3*c*, a separation pad 3*d*, registration rollers 3*e*, and the like.

Thereafter, the toner image formed on the photosensitive drum 10 provided in the cartridge B is transferred onto the recording material 2 by applying a voltage of a polarity opposite to a charge polarity of the toner image to a transfer roller 4 as a transfer means. The recording material 2 is conveyed to a fixing means 5 by a conveying guide 3*f*.

The fixing means 5 is constituted by a driving roller 5*a* and a fixing roller 5*c* containing therein a heater 5*b* and fixes the transferred toner image by applying heat and pressure to the recording material 2 passing through the fixing means 5.

Then, the recording material 2 is conveyed by a sheet discharge roller pair 3*g* and is discharged on a sheet discharge portion 6.

Incidentally, a cartridge mounting portion 7 is a chamber (space) in which the cartridge B is to be mounted (disposed). In a state in which the cartridge B is located in the chamber, a driven coupling member 220 (described later) is connected to a driving shaft of the apparatus main assembly A. In this embodiment, the disposition of the cartridge B at the mounting portion 7 is referred to as mounting of the cartridge B in the apparatus main assembly A. Further, removal of the cartridge B from the apparatus main assembly A is referred to as demounting of the cartridge B from the apparatus main assembly A.

(Brief Description of Cartridge)

The cartridge to which the present invention is applicable will be described.

Figure 2:
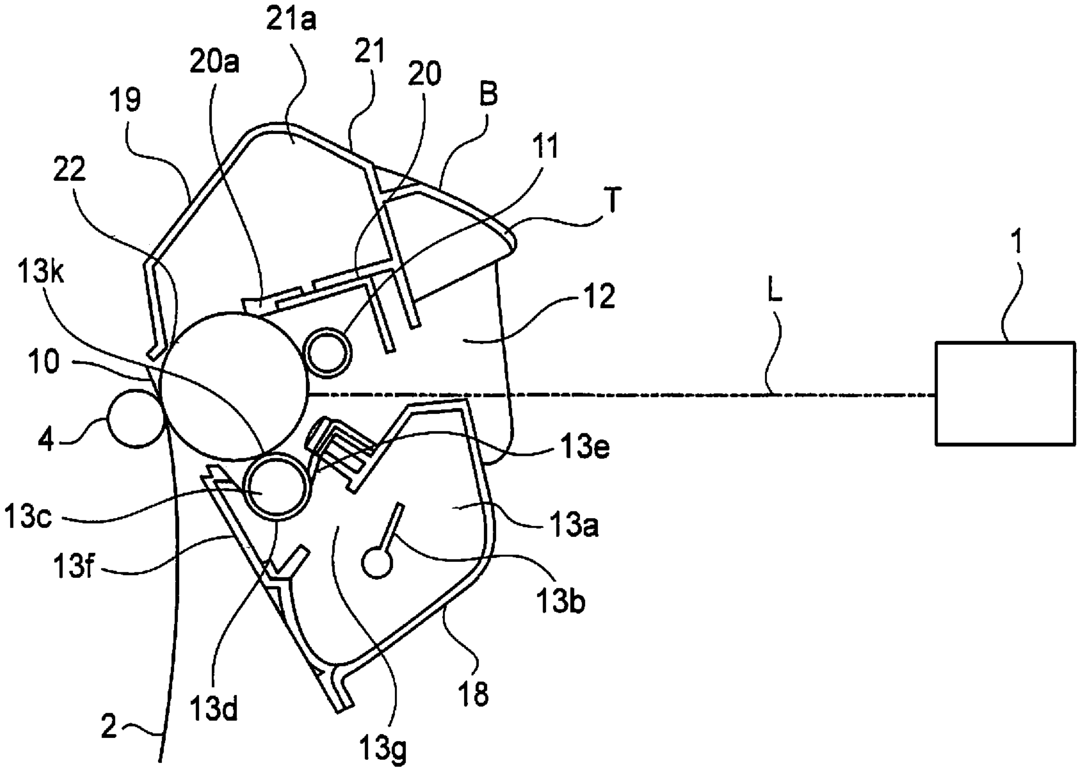
FIGS. 2 to 6 are illustrations of a structure of a cartridge to which the present invention is applicable.

As shown in FIG. 2, the cartridge B includes the photosensitive drum 10 as the electrophotographic photosensitive member having a photosensitive layer. The surface of the photosensitive drum 10 is electrically charged uniformly by a charging roller 11 which contacts the photosensitive drum 10 and is rotated by the rotation of the photosensitive drum 10. The charged photosensitive drum 10 is exposed to the laser light L from the optical system 1 through an exposure opening 12, so that the electrostatic latent image is formed. This latent image is to be developed by a developing means 13. The developing means 13 feeds the toner in a toner accommodating container 13*a* into a developing container 13*f* through an opening of the toner accommodating container 13*a* by a rotatable toner feeding member 13*b* as a toner feeding means. Thereafter, on the surface of a developing roller 13*d* which is a rotatable member containing a fixed magnet 13*c*, a triboelectrically charged toner layer is formed by a developing blade 13*e*. The developing roller 13*d* is urged toward the photosensitive drum 10 by an urging spring (not shown) while keeping a certain clearance with respect to the photosensitive drum 10 by spacer rollers 13*k* as a spacing member. By transferring the toner layer formed on the surface of the developing roller 13*d* onto the photosensitive drum 10 depending on the electrostatic latent image, the toner image is formed, thus visualizing the electrostatic latent image.

Thereafter, the toner image is transferred onto the recording material 2 by applying a voltage of an opposite polarity to the charge polarity of the toner image to a transfer roller 4 provided in the apparatus main assembly A. The toner remaining on the photosensitive drum 10 is removed by a cleaning blade 20*a* provided on a cleaning means 20 and is scooped by a scooping sheet 22 and then is collected in a removed toner containing portion 21*a*.

The cartridge B is constituted by a first frame unit 18 and a second frame unit 19 which are integrally supported.

Figure 3:
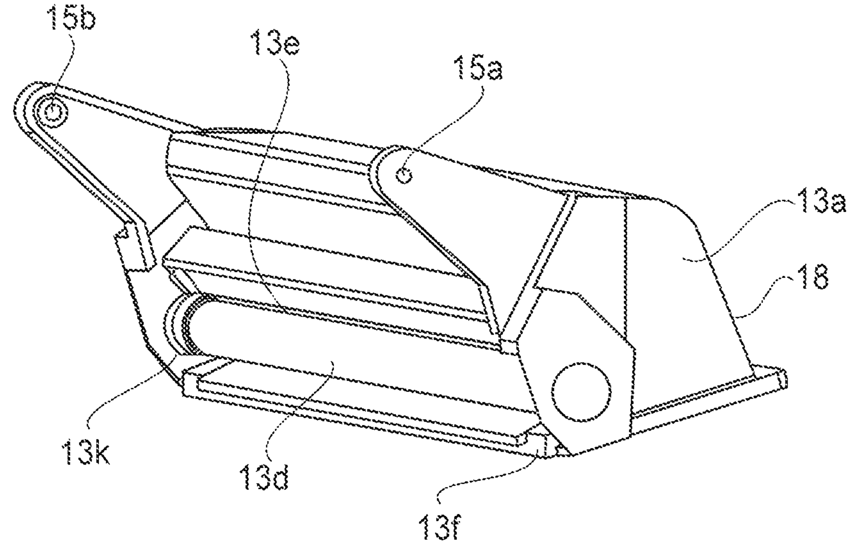

The first frame unit 18 is, as shown in FIG. 3, the toner accommodating container 13*a* and the developing container 13*f*. In the developing container 13*f*, members such as the developing roller 13*d*, the spacer rollers 13*k* provided at both end portions of the developing roller 13*d*, the developing blade 13*e*, and the like are provided.

Further, the first frame unit 18 is provided with a rotational movement hole 15*a* at one end thereof and is provided with a rotational movement hole 15*b* at the other end of thereof.

Figure 4:
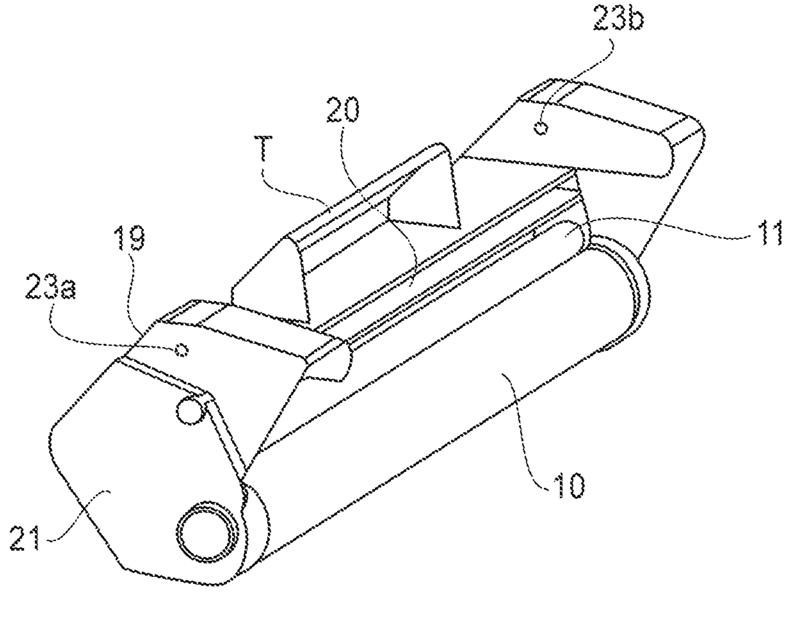

The second frame unit 19 is, as shown in FIG. 4, constituted by a cleaning frame 21, the photosensitive drum 10 provided in the cleaning frame 21, the cleaning means 20, the charging roller 11, and the like.

The second frame unit 19 is provided with a fixed hole 23*a* at one end thereof and is provided with a fixed hole 23*b* at the other end thereof.

The cleaning frame 21 is provided with a holding portion T.

Figure 5:
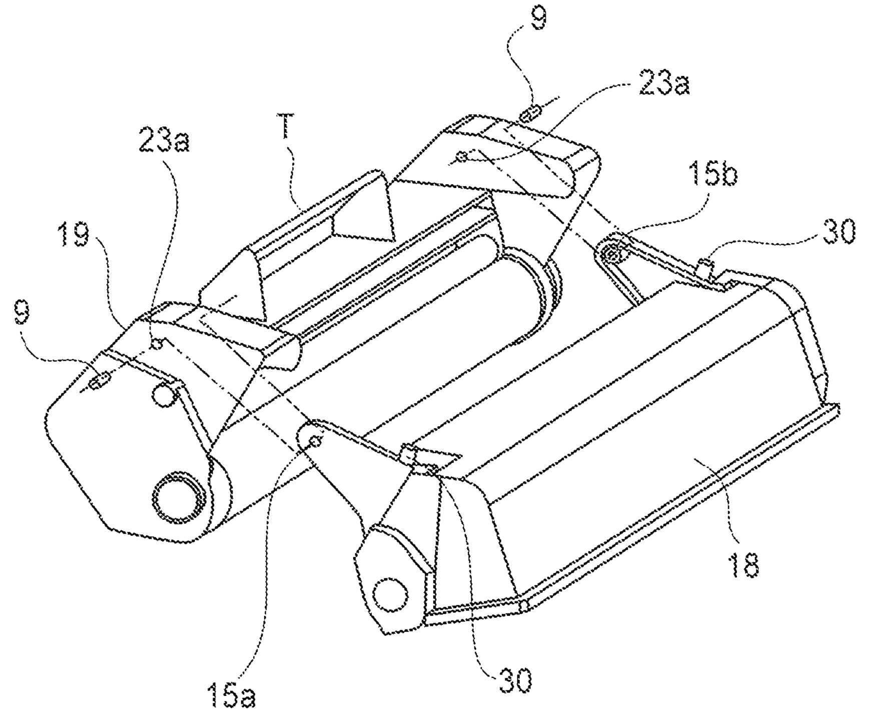
Figure 6:
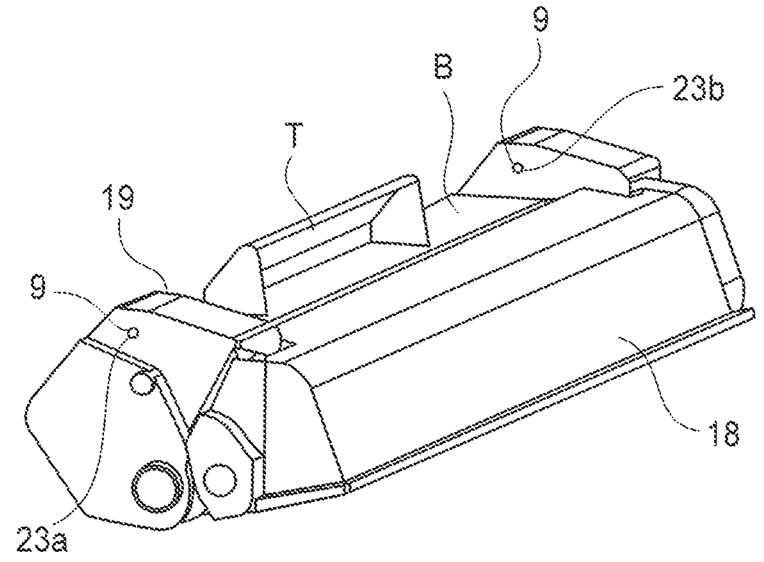

As shown in FIGS. 5 and 6, the rotational movement holes 15*a* and 15*b* provided at the both end portions of the first frame unit 18 are connected rotatably and movably through pins 9 to the fixed holes 23*a* and 23*b* provided at the both end portions of the second frame unit 19.

By urging springs 30 provided between the first frame unit 18 and the second frame unit 19, the developing roller 19 is urged and abutted toward the photosensitive drum 10 while keeping the certain clearance through the spacer rollers 13*k*.

Incidentally, the cartridge B is mountable in and demountable from the apparatus main assembly A by a user.

In the following description, a direction (axial direction) parallel to a rotational axial line of the photosensitive drum 10 is referred to as a longitudinal direction.

(Coupling Unit)

A coupling unit U2 will be described with reference to Parts (a) and (b) of FIG. 7 and Parts (a) and (b) of FIG. 8.

FIG. 7, Part (a), is a perspective view of the coupling unit U2. FIG. 7, Part (b) is a sectional view taken along S1-S1 line indicated in FIG. 7, Part (a). Parts (a) and (b) of FIG. 8 are exploded perspective views of the coupling unit U2.

The coupling unit U2 is constituted by a housing 200, the driven coupling member 220, a cartridge urging spring 215, and a cover member 210. As shown in the figures, the driven coupling member 220 is mounted into the housing 200, so that a sliding shaft 220*a* of the driven coupling member 220 is supported coaxially and movably in the axial direction by a shaft supporting portion 200*d* of the housing 200. Similarly, driving grooves 220*b* and 220*c* of the driven coupling member 220 are supported movably in the axial direction by driving ribs 201*a* and 201*b*, respectively, of the housing 200. By the support of the driving grooves 220*b* and 220*c* by the driving ribs 201*a* and 201*b*, a circumferential position of the driven coupling member 220 is determined in the housing 200.

Further, an abutting portion 220*d* of the driven coupling member 220 abuts against an abutting portion 200*e* of the housing 200, so that the driven coupling member 220 is retained.

The driven coupling member 220 is provided with the cartridge urging spring 215 at one end thereof, and the cartridge urging spring 215 is compressed by the cover member 210. Claw portions 210*a* and 210*b* provided at two positions of the cover member 210 are mounted in the housing 200 while being elastically deformed during the assembly, and end portions 210*a*1 and 210*b*1 enter engaging holes 202*a* and 202*b*, respectively, thus being engaged in the housing 200. By the cover member 210, the cartridge urging spring 215 and the driven coupling member 220 are retained in the housing 200.

As described above, the driven coupling member 220 is supported movably along the axial direction of the driven coupling member 220 by the housing 200 and is urged toward a right side in FIG. 7, Part (a), by the cartridge urging spring 215.

When a rotational driving force is transferred from the apparatus main assembly A to the driven coupling member 220, the driving grooves 220*b* and 220*c* of the driven coupling member 220 and the driving ribs 201*a* and 201*b* of the housing 200 contact each other to transmit the driving force. In other words, the driven coupling member 220 and the housing 200 are coaxially rotated.

(Electrophotographic Photosensitive Drum Unit)

Next, with reference to Parts (a) and (b) of FIG. 9, a constitution of the electrophotographic photosensitive drum unit (hereinafter referred to as a drum unit) will be described. FIG. 9, Part (a), is a perspective view of a drum unit U1 and FIG. 9, Part (b), is an exploded perspective view of the drum unit U1.

The photosensitive drum 10 is prepared by applying a photosensitive layer 10*b* onto an electroconductive drum cylinder 10*a* of aluminum or the like. At both end portions of the drum cylinder 10*a*, openings 10*al* and 10*a*2, which are coaxial with the drum surface, through which a drum flange 150 and the coupling unit U2 are engageable with the drum unit U1.

The coupling unit U2 is provided at one end side of the drum unit U1 on which the driving force is transmitted from the apparatus main assembly A to the drum unit U1 (hereinafter referred to as a driving side).

Incidentally, a gear 200*c* through which the coupling unit U2 transmits the driving force, received from the apparatus main assembly A, to the developing roller 13*d* (FIG. 2) is provided in the coupling unit U2.

The drum flange 150 is provided at the other end side of the drum unit U1 opposite from the driving side of the drum unit U1 (hereinafter referred to as a non-driving side).

In the drum flange 150, a drum engaging portion 150*b* and a shaft supporting portion 150*a* are coaxially disposed. Further, in the drum flange 150, a grounding plate 151 is disposed. The grounding plate 151 is an electroconductive thin plate-like member (principally of metal). The grounding plate 151 includes drum contact portions (abutment portions) 151*b*1 and 151*b*2 contactable to an inner circumferential surface of the electroconductive drum cylinder 10*a* and includes a contact portion 151*a* contactable to a drum grounding shaft 154(described later). The grounding plate 151 is electrically connected with the apparatus main assembly A in order to ground the photosensitive drum 10.

With respect to the drum flange 150, the drum engaging portion 150*b* engages in the opening 10*al* provided at one end of the drum cylinder 10*a*. Further, with respect to the coupling unit U2, the drum engaging portion 200*b* engages in the opening 10*a*2 provided at the other end of the drum cylinder 10*a*. Each of the drum engaging portions 150*a* and 200*b* is fixed in the drum cylinder 10*a* by bonding, clamping, and the like.

Thus, the coupling unit U2 and the drum cylinder 10*a* are coaxially fixed and one rotated integrally.

FIG. 10 illustrates a method of mounting the coupling unit U1 in the cartridge B.

On the non-driving side, a shaft hole 25 provided in the cleaning frame 21 and the shaft supporting portion 150*a* of the drum flange 150 are shaft-supported by the drum grounding shaft 154. At this time, the drum grounding shaft 154 is press-fitted in the shaft hole 25, so that the shaft supporting portion 150*a* and the drum grounding shaft 154 are rotatable.

On the other hand, on the driving side, a coupling shaft 200*a* of the coupling unit U2 is rotatably supported by a shaft supporting portion 24*a* of a drum shaft supporting member 24. The drum supporting member 24 is fixed in the cleaning frame 21 on the driving side through a screw 26.

Thus, drum unit U1 is rotatably supported by the first frame unit 18.

(Mounting and Demounting of Cartridge B9

In the case where the cartridge B is mounted in the apparatus main assembly A, as shown in FIG. 11, a main assembly cover 8 is opened upward about a hinge 8*a* and then the cartridge B is inserted in an intersecting direction intersecting the driving shaft (a perpendicular direction substantially perpendicular to the driving shaft), i.e., a direction indicated by an arrow X. As shown in FIG. 12, Part (a), on the driving side of the apparatus main assembly A<a driving side main assembly guide member 40 is provided with an upper guide groove 40*a* and a lower guide groove 40*b*. Further, on the non-driving side, as shown in FIG. 12, Part (b), a non-driving side main assembly guide member 45 is provided with an upper guide groove 45*a* and a lower guide groove 45*b*.

Figure 13:
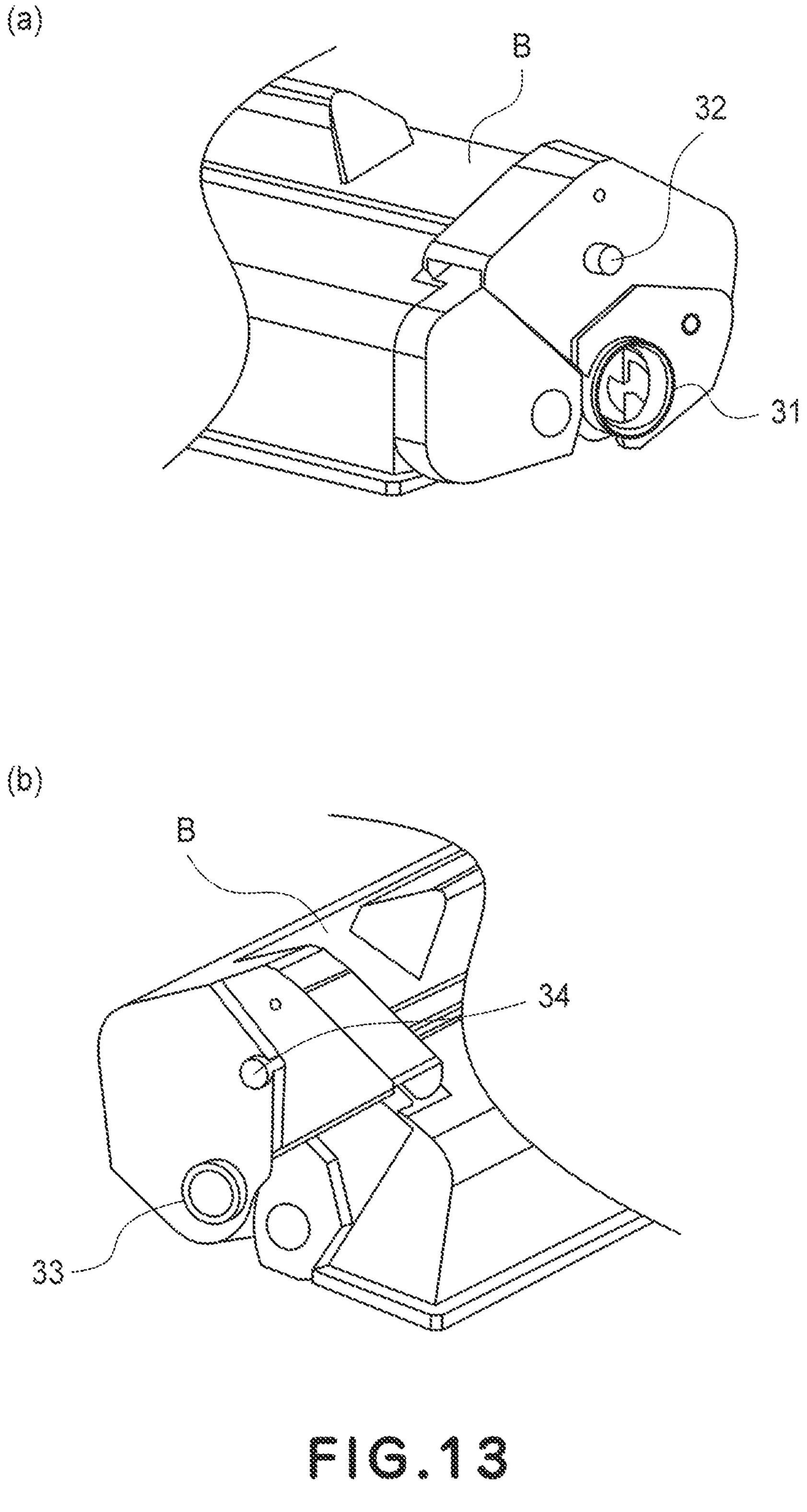

On the other hand, as shown in FIG. 13, Part (a), on the driving side of the cartridge B, a driving side positioning boss 31 and a rotation preventing boss 32 are provided. Further, as shown in FIG. 13, Part (b), on the non-driving side, a non-driving side positioning boss 33 and a guide boss 34 are provided.

The mounting of the cartridge B in the apparatus main assembly A is performed by inserting the cartridge B into the apparatus main assembly A after the driving side positioning boss 31 provided on the driving side of the cartridge B is engaged with the upper guide groove 40*a* of the driving side main assembly guide member 40 and the rotation preventing boss 32 is engaged with the lower guide groove 40*b* (FIG. 14, Part (a)).

When the cartridge B is further pushed in, as shown in FIG. 14, Part (b), the driving side positioning boss 31 of the cartridge B falls into the upper guide groove 40*a* to reach a main assembly positioning portion 40*a*1 formed at an end of the upper guide groove 40*a* of the driving side main assembly guide member 40, so that the cartridge B is positioned. Similarly, the rotation preventing boss 32 falls in a rotational position regulation portion 40*b*1 to contact a rotational position regulation surface 40*b*2 formed at an end of the lower guide groove 40*b*, so that the cartridge B is positioned.

On the other hand, on the non-driving side, the cartridge B is inserted into the apparatus main assembly A after the non-driving side positioning boss 33 provided on the non-driving side of the cartridge B is engaged with the upper guide groove 45*a* of the non-driving side main assembly guide member 45 and the guide boss 34 is engaged with the lower guide groove 45*b* (FIG. 15, Part (a)).

When the cartridge B is further pushed in, as shown in FIG. 15, Part (b), the non-driving side positioning boss 33 of the cartridge B falls into the upper guide groove 45*a* to reach a main assembly positioning portion 45*al* formed at an end of the upper guide groove 45*a* of the non-driving side main assembly guide member 45, so that the cartridge B is positioned. The guide boss 34 falls in a receiving recessed portion 45*b*1 formed at an end of the lower guide groove 45*b*, Thus, the cartridge B is mounted at the cartridge mounting portion 7.

As described above, the cartridge B is inserted into the apparatus main assembly A while mounting loci thereof are regulated by the driving side upper guide groove 40*a*, the driving side lower guide groove 40*b*, the non-driving side upper guide groove 45*a*, and the non-driving side lower guide groove 45*b*.

When the cartridge B is demounted, the holding portion T is held and the cartridge B is pulled out. The cartridge B comes out of the apparatus main assembly A while loci of the respective bosses described above are regulated by the respective guide grooves of the apparatus main assembly A. That is, the cartridge B is moved in the above-described intersecting direction, thus being taken out. In this way, the cartridge B is demounted from the apparatus main assembly A.

(Operation of Coupling Portion)

An operation of the coupling unit U2 when the cartridge B is mounted in and demounted from the apparatus main assembly A will be described.

As shown in FIG. 16, a tilted member 41 is provided at the upper guide groove 40*a* portion of the driving side main assembly guide member 40 of the apparatus main assembly A.

Further, in a state in which the cartridge B is mounted at the cartridge mounting portion 7, a driving coupling member 250 as a rotatable driving transmitting member is provided at a position in which it opposes the driven coupling member 220.

FIG. 17 shows a structure of the driving coupling member 250. The driving coupling member 250 is provided with a driving coupling portion 260 engageable with the driven coupling member 220 of the cartridge B and a gear portion 251 for receiving the driving force from a driving motor M (FIG. 18) provided in the apparatus main assembly A.

With reference to FIG. 18, a constitution in the neighborhood of the tilted member 41 and the driving coupling member 250 will be described briefly. FIG. 18 is a sectional view taken along S2-S2 line indicated in FIG. 16. As shown in the figure, the driving coupling member 250 is rotatably supported by a main assembly side plate 42 through a shaft supporting member 252. The tilted member 41 forms a tilted surface 41*c* from an upstream portion 41*a* toward a downstream portion 41*b* at the time of mounting the cartridge B. The downstream portion 41*b* has the substantially same height as that of an end portion 261 of the driving coupling portion 260.

As shown in FIG. 19, the driving coupling portion 260 includes a drive transmitting portion 262 (at two positions) for transmitting the driving force and includes a driving side contact portion 300. Here, the driving side contact portion 300 is tilted portion (tilted surface) which intersects (tilts) with respect to a rotational axial direction of the driving coupling portion 260. On the other hand, the driven coupling member 220 includes a driving force receiving portion 222 (at two positions), contactable to the drive transmitting portion 262, to which the driving force is transmitted from drive transmitting portion 262, and includes a non-driving side contact portion 320 contactable to the driving side contact portion 300.

A state in which both of the cartridge portions are engaged and are in a driving force receiving phase is shown in Parts (a) and (b) of FIG. 20. FIG. 20, Part (b), is a schematic sectional view of a coupling engaging portion as seen from the driven coupling member 220 side.

When the driving coupling portion 260 is rotated in a direction indicated by an arrow R in the figure, the two drive transmitting portions 262 of the driving coupling portion 260 and the driving force receiving portions 222 of the driven coupling member 220 oppose and contact each other to transmit the driving force.

The drive transmission is effected by abutment between the projection constituting the drive transmitting portion 262 and the projection constituting the driving force receiving portion 222. In the following description of this and subsequent embodiments, the drive transmitting portion 262 means the radially outermost part of the abutment area of the drive transmitting portion 262, and the driving force receiving portion 222 means the radially outermost part of the abutment area of the driving force receiving portion 222.

A state of the coupling unit U2 when the cartridge B is mounted in the apparatus main assembly A is shown in FIG. 21. In this figure, for easy explanation, the members for the cartridge B are omitted from illustration. Further, the apparatus main assembly A is illustrated in cross section. When the cartridge B is mounted (in a direction indicated by an arrow K in the figure (the intersecting direction intersecting the axial direction of the driven coupling member 220)), the end portion 261 of the driven coupling member 220 passes while contacting the tilted surface 41*c* of the tilted member 41. At this time, the coupling member 220 is retracted toward the inside of the coupling unit U2 (in a direction of an arrow L in FIG. 21). As a result, the rotation axis (shaft) of the driven coupling member 220 is moved to a position in which it substantially coincides with the rotation axis (shaft) of the driving coupling member 250.

As another constitution for retracting the driven coupling member 220, a constitution in which a tilted surface 253 as a second driving side contact portion (another driving side contact portion) is provided around the driving coupling portion 260 is shown in FIG. 22, Part (a). In this constitution, as shown in FIG. 22, Part (b), the driven coupling member 220 has an end portion 261 as a second driven side contact portion (another driven side contact portion) contactable to the second driving side contact portion. When the cartridge B is mounted (in the direction of the arrow K in the figure), the end portion 261 passes while contacting the tilted surface 253. At this time, the driven coupling member 220 is retracted toward the inside of the coupling unit U2 (in the direction of the arrow L in the figure). As a result, the rotation axis of the driven coupling member 220 can be moved to a position in which it is substantially collinear with the rotation axis of the driving coupling member 250. In this constitution, the driven coupling member 220 can be retracted without providing the tilted member 41. Incidentally, in order to retract the driven coupling member 220 when the cartridge B is mounted in the apparatus main assembly A, at least one of the second driving side contact portion and the second driven side contact portion may only be required to be tilted.

When the cartridge B is mounted at the mounting portion 7, the driven coupling member 220 and the driving coupling member 250 are coaxially disposed. At the same time, by the above-described cartridge urging spring 215, the driven coupling member 220 is placed in a surface in which it is urged toward the driving coupling portion 260.

At this time, the two drive transmitting portions 262 of the driving coupling portion 260 and the two driving force receiving portions 222 of the driven coupling member 220 do not oppose and contact each other in some cases in which the both of the coupling members are not necessarily in the drive transmitting phase (Parts (a) and (b) of FIG. 23 and Parts (a) and (b) of FIG. 24).

In the phase shown in Parts (a) and (b) of FIG. 23, by the driving force from the driving motor, the driving coupling portion 260 is rotated in the direction indicated by the arrow R in FIG. 23, Part (b). As a result, the two drive transmitting portions 262 of the driving coupling portion 260 and the two driving force receiving portions 222 of the driven coupling member 220 oppose and contact each other and are in the drive transmitting phase, so that the drive transmission can be performed.

In the phase shown in Parts (a) and (b) of FIG. 24, the ends of the both coupling members have contacted, so that the coupling members are in a surface in which the coupling members are not engageable with each other. Here, when the driving coupling portion 260 is rotated in the direction of the arrow R indicated in FIG. 24, Part (b), the driven coupling member 220 is moved toward the driving coupling portion 260 side by the above-described urging force at the time when the both coupling members enter a phase in which the contact between the ends of the both coupling members is eliminated. Thereafter, the two drive transmitting portions 262 of the driving coupling portion 260 and the two driving force receiving portions 222 of the driven coupling member 220 oppose and contact each other and enter the drive transmitting phase, thus enabling the drive transmission.

FIG. 25 is a sectional view showing a portion at which the drive transmitting portion 262 of the driving coupling portion 260 and the driving force receiving portion 222 of the driven coupling member 220 contact each other. As shown in the figure, the drive transmitting portion 262 of the driving coupling portion 260 and the driving force receiving portion 222 of the driven coupling member 220 are tilted with respect a drive transmitting axis.

When the driving coupling portion 260 is rotated in a direction indicated by an arrow R2 in FIG. 25 to transmit the driving force to the driven coupling member 220, a driven transmitting force F is exerted from the drive transmitting portion 262 to the driving force receiving portion 222 with respect to a direction perpendicular to their contact surface. As described above, the transmitting portions are tilted. On the driving force receiving portion 222, a drive transmitting axial direction component force Fa of the drive transmitting force F acts. By this action of the drive transmitting axial direction component force Fa, the driven coupling member 220 is attracted toward the driving coupling member 250 until a longitudinal contact portion 221 of the driven coupling member 220 contacts a longitudinal contact portion 264 of the driving coupling portion 260. As a result, the engagement between the both coupling members is further ensured, so that the contact between the drive transmitting portion 262 and the driving force receiving portion 222 can be performed stably.

Further, the longitudinal contact portion 221 of the driven coupling member 220 and the longitudinal contact portion 264 of the driving coupling portion 260 contact each other, so that positions of the both coupling members with respect to their longitudinal directions are determined. Thus, the longitudinal positions of the drum unit U1 and the driving coupling member 250 are determined.

Incidentally, in this embodiment, in this embodiment, the example in which both of the drive transmitting portion 262 and the driving force receiving portion 222 are tilted is described but a similar effect can be obtained when either one of the transmitting portions is tilted and the drive transmitting axial direction component force Fa acts in a direction in which the coupling members are attracted to each other.

A constitution in which only the drive transmitting portion 262 is tilted is shown in FIG. 26, Part (a), a constitution in which only the driving force receiving portion 222 is tilted is shown in FIG. 26, Part (b).

Next, the case where the cartridge B is taken out from the apparatus main assembly A will be described.

When the cartridge B is started to be pulled out of the apparatus main assembly A, as shown in FIG. 27, Part (a), the rotation axis of the driving coupling portion 260 and the rotation axis of the driven coupling member 220 are deviated from each other. In this figure, an indicated arrow N represents a demounting direction of the cartridge B, i.e., a movement direction of the driven coupling member 220. Then, as shown in FIG. 27, Part (b), the driving side contact portion 300 of the driving coupling portion 260 and the driven side contact portion 320 of the driven coupling member 220 contact each other. As a result, a drive transmitting axial direction component force Fc of a force generated at the contact portion acts on the driven coupling member 220. That is, the driven side contact portion 320 receives the force from the driving side contact portion 300. For that reason, the driven coupling member 200 is retracted relative to the main body of the cartridge B in a direction indicated by the arrow L in FIG. 27, Part (b) (the axial direction of the driven coupling member 220). When the cartridge B is further pulled out, the driven side contact portion 320 completely passes through the driving side contact portion 300, so that the engagement between the both coupling members is released as shown in FIG. 27, Part (c). In Parts (a) to (c) of FIG. 27, the driving side contact portion 300 is tilted, in order to release the engagement between the both coupling members, at least one of the driving side contact portion 300 and the driven side contact portion 320 may only be required to be tilted.

When the cartridge B is further pulled out, the cartridge B is taken out of the apparatus main assembly A.

A further detailed description will be made with reference to Parts (a) to (c) of FIG. 28, Parts (a) to (c) of FIG. 29, and Parts (a) to (c) of FIG. 30. Parts (a) to (c) of FIG. 28 show a state of start of the pulling-out of the cartridge B; Parts (a) to (c) of FIG. 29 show a state during a coupling (engagement) releasing operation; and Parts (a) to (c) of FIG. 30 show a state after the coupling releasing operation. Further, Figures Part (a) of FIG. 28, Part (a) of FIG. 29, and Part (a) of FIG. 30 are perspective views of the coupling portions; Part (b) of FIG. 28, Part (b) of FIG. 29, and Part (b) of FIG. 30 are sectional views of the engaging portions; and Part (c) of FIG. 28, Part (c) of FIG. 29, and Part (c) of FIG. 30 are schematic views of the coupling engaging portion as seen from the driven coupling member 220 side.

In the case where the cartridge B is pulled out of the apparatus main assembly A in the direction of the arrow N indicated in Part (a) of FIG. 28, Part (c) of FIG. 28, Parts (a) to (c) of FIG. 29, and Parts (a) to (c) of FIG. 30, the driven coupling member 220 is similarly moved in the indicated arrow N direction at the coupling engaging portion. At this time, in a state in which the driven coupling member 220 and the driving coupling member 250 contact each other at a contact portion P shown in Part (c) of FIG. 28, Part (c) of FIG. 29, and Part (c) of FIG. 30, the driven coupling member 220 is rotated in a direction indicated by an arrow R1 in these figures (integrally with the drum unit U1) by a pulling-out force of the cartridge B. That is, the driven coupling member 220 is moved in the indicated arrow N direction while being rotated in the indicated arrow R1 direction in the state in which the driven coupling member 220 and the driving coupling member 250 contact each other at the contact portion P. At the same time, the driven coupling member 220 is retracted in the direction of the arrow L indicated in Parts (a) and (b) of FIG. 29 and Parts (a) and (b) of FIG. 30 by the contact between the driving side contact portion 300 and the driven side contact portion 320 as described above.

When the couplings perform this releasing operation, a surface 265*a* of the projection constituting the drive transmitting portion 262 on the side where there is no contact portion P and a surface 224*a* of the projection constituting the driving force receiving portion 222 come near to each other (Part (c) of FIG. 28, Part (c) of FIG. 29, and Part (c) of FIG. 30). Between these surfaces 265*a* and 224*a* of the projections, a clearance is provided. As shown in Parts (a) to (c) of FIG. 30, the driven coupling member 220 is rotated and retracted in the indicated arrow L direction until the surface 265*a* of the projection contacts the surface 224*a* of the projection, so that interference between the surfaces of the both projections is avoided.

The constitution of the interference avoidance in this embodiment will be described more specifically with reference to FIG. 31, Parts (a) and (b). In FIG. 31, Part (a), the driven coupling member 220 is moved in the pulling-out direction N is retracted in the direction L until the projection 266 constituting the drive transmitting portion 262 of the driving coupling portion 260 and the projection 226 constituting the driving force receiving portion 222 of the driven coupling member 220 can be separated from each other. At this time, a distance of movement of the driven coupling member 220 in the pulling-out direction N is R.

Further, on the assumption that the driving side contact portion 300 is not provided and the retracting operation of the driven coupling member 220 is not performed, a distance at which the driven coupling member 220 is movable in the pulling-out direction N while being rotated in the indicated arrow R1 direction is ((FIG. 31, Part (b)). FIG. 31, Part (b) shows a state in which the driven coupling member 220 is moved in the state in which the driven coupling member 220 and the driving coupling member 250 contact each other at the contact portion (point) P and is prevented from being moved in the pulling-out direction N by the contact between the surface 265*a* of the projection of the driving coupling portion 260 and the surface 224*a* of the projection of the driven coupling member 220.

In this constitution, in any pulling-out direction, $\alpha \geq \beta$ is satisfied. As a result, before the driven coupling member 220 is rotated and the surface 265*a* of the projection contacts the surface 224*a* of the projection, the driven coupling member is retracted in the indicated arrow L direction, so that the interference between the both projections can be avoided.

Another constitution of the interference avoidance will be described. In Parts (a) to (c) of FIG. 32, the clearance between the surface 265*a* of the projection and the surface 224*a* of the projection is made larger than in the above-described constitution.

FIG. 32, Part (a), shows a state of start of the demounting of the cartridge B. FIG. 32, Part (b), shows a state in which the contact at the contact point P is completed during the demounting, and FIG. 32, Part (c), shows a state in which the cartridge B has been demounted.

In this constitution, the above-described contact (abutment) between the surface 265*a* of the projection and the surface 224*a* of the projection by the movement of the driven coupling member 220 in the direction N and the rotation operation of the driven coupling member 220 in the direction R1 do not occur. Therefore, the interference by the releasing operation of the coupling members can be avoided without relying on the retraction of the driven coupling member 220.

Further, as shown in Parts (a) and (b) of FIG. 33, a retraction distance of the driven coupling member 220 by the driving side contact portion 300 is Lb. An opposing distance (abutment distance), with respect to the rotational axial direction at which the projection 266 constituting the drive transmitting portion 262 of the driving coupling portion 260 and the projection 226 constituting the driving force receiving portion 222 of the driven coupling member 220 oppose each other is La (FIG. 33, Part (a)).

By constituting the distances La and Lb so as to satisfy: Lb≥La, it is possible to release the engagement between the coupling members with reliability (FIG. 33, Part (b)).

Further, as shown in FIG. 34, the projection 266 constituting the drive transmitting portion 262 of the driving coupling portion 260 is configured so as not to protrude from an end portion line 301 of the driving side contact portion 300. Similarly, the photosensitive drum 225 constituting the driving force receiving portion 222 of the driven coupling member 220 is configured so as not to protrude from an end portion line 321 of the driven side contact portion 320. As a result, even after the engagement between the coupling members is released, the both coupling members do not interfere with each other, so that the cartridge B can be demounted.

In this embodiment, the case where the driven coupling member 220 is rotated by the pulling-out force of the cartridge B when the engagement between the coupling portions is released is described. However, even when the driving coupling member 250 rotated, the engagement between the coupling portions is also released by the same action as the above-described constitution. A state in which the engagement is released by the rotation of the driving coupling member 250 is shown in Parts (a) and (b) of FIG. 35, Parts (a) and (b) of FIG. 36, and Parts (a) and (b) of FIG. 37.

Parts (a) and (b) of FIG. 35 show a state of start of the pulling-out of the cartridge B, Parts (a) and (b) of FIG. 36 show a state during the coupling releasing operation, and Parts (a) and (b) of FIG. 37 show a state after the coupling releasing operation.

Part (a) of FIG. 35, Part (a) of FIG. 36, and Part (a) of FIG. 37 are sectional views of the engaging portions, and Part (b) of FIG. 35, Part (b) of FIG. 36, and Part (b) of FIG. 37 are schematic sectional views of the coupling engaging portion as seen from the driven coupling member 220 side.

As shown in these figures, in the state in which the driving coupling member 250 and the driven coupling member 220 contact each other at the contact portion P, the driving coupling member 250 is rotated in a direction of an arrow R2 by the pulling-out force for the cartridge B. At the same time, the driven coupling member 220 is moved in the indicated arrow N direction and is retracted in the indicated arrow L direction by the action of the driving side contact portion 300. Thus, the coupling engagement is released.

Further, even when the both coupling members are rotated at the same time, the coupling engagement is released by the same action.

By the above-described operations, it is possible to demount the cartridge B from the apparatus main assembly A.

Incidentally, as shown in Parts (a) and (b) of FIG. 38, even in a constitution in which the driving side contact portion 300 is provided on the driven coupling member 220, by the force for pulling out the cartridge B in the indicated arrow L direction, the driven coupling member 220 can be retracted in the indicated arrow N direction. Thus, the release of the coupling engagement can be performed. FIG. 38, Part (a), is a perspective view of the driving coupling portion 260 and the driven coupling member 220, and FIG. 38, Part (b), is a schematic sectional view showing a state of the engaging portions during the demounting.

Parts (a) and (b) of FIG. 30 show a constitution in which the driving coupling portion 260 is provided with a tilted portion 300*a* as the driving side contact portion and the driven coupling member 220 is provided with another tilted portion 300*b*, as the driven side contact portion, substantially parallel to the tilted portion 300*a*. Even in this constitution, by the force for pulling out the cartridge B in the indicated arrow L direction, the driven coupling member 220 can be retracted in the indicated arrow N direction. The driven side contact portion 320 may be the tilted portion without constituting the driving side contact portion 300 as the tilted portion. That is, at least one of the driving side contact portion 300 and the driven side contact portion 320 may only be required to be tilted. FIG. 39, Part (a), is a perspective view of the driving coupling portion 260 and the driven coupling member 220, and FIG. 39, Part (b), is a schematic sectional view showing a state of the engaging portions during the demounting. In this constitution, the contact between the contact portions is stably effected, so that the coupling engagement can be released further smoothly.

Embodiment 2

Next, another embodiment according to the present invention will be described.

A constitution other than the driving side contact portion 300 is similar to that in Embodiment 1. For this reason, redundant description will be omitted and members having the same functions as those in Embodiment 1 are represented by the same reference numerals or symbols.

In this embodiment, another constitution for determining the longitudinal positions of the driving coupling portion 260 and the driven coupling member 220 will be described.

The driving side contact portion 300 provided on the driving coupling portion 260 shown in FIG. 40(*a*) is a surface defined by the rotational operation with the rotational axis of the driving coupling portion 260 as a symmetrical axis (a partly conical surface as an example in the figure). On the other hand, at the end of the driven coupling member 220, an annular driven side contact portion 320 is provided so that the rotational axis of the driven coupling member 220 is the center thereof.

As shown in FIG. 40, Part (b), when the both coupling members are engaged with each other while attracting each other, by employing a constitution in which these driving side contact portion 300 and driven side contact portion 320 are brought into contact with each other, the longitudinal positions of the both coupling members can be determined.

Further, in this constitution, the rotational axis of the driving side contact portion 300 of the driving coupling portion 260 and the rotational axis of the driven side contact portion 320 of the driven coupling member 220 can be aligned with each other with accuracy.

Similarly, a constitution shown in FIG. 39, Part (a), in which the both coupling members are provided with a tilted portion will be described. Another tilted portion 300*b* is a surface defined by the rotational operation with the rotational axis of the driven coupling member 220 as the symmetrical axis, and a tilted portion 300*a* is a surface defined by the rotational operation with the rotational axis of the driving coupling portion 360 as the symmetrical axis. As shown in FIG. 31, when a constitution in which another tilted portion 300*b* and the tilted portion 300*a* are caused to contact each other at the time when the both coupling members are engaged with each other while attracting each other is employed, the longitudinal positions of the both coupling members can be determined. At the same time, the rotational axes of the both coupling members can be aligned with each other with accuracy. In the figure, as an example of each of the surfaces defined by the rotational operations, with the rotational axes of the respective coupling members, a partly conical surface is shown.

In the constitution, described in this embodiment, in which the driving side contact portion 300 and the driven side contact portion 320 are caused to contact each other to align the rotational axis of the driving coupling portion 260 and the rotational axis of the driven coupling member 220 with each other with accuracy, the driving axis (shaft) of the apparatus main assembly A and the rotational axis of the drum unit U1 can be aligned with each other with accuracy. As a result, positional accuracy of the photosensitive drum 10 relative to the optical system 1 of the apparatus main assembly A is enhanced, so that improvement in image quality can be realized.

Embodiment 3

Another embodiment according to the present invention will be described.

In this embodiment, a constitution in which the drive transmitting portion is provided at three portions will be described.

Incidentally, a constitution other than the drive transmitting portion is similar to that in Embodiment 1. For that reason, redundant description will be omitted and members having the same functions as those in Embodiment 1 are represented by the same reference numerals or symbols.

As shown in FIG. 42, Part (a), the driving coupling portion 260 in this embodiment is provided with three drive transmitting portions 262 with the rotational axis of the driving coupling portion 260 as the center thereof while shifting each phase by 120 degrees. Similarly, the driven coupling member 220 is provided with three driving force receiving portions 222 with the rotational axis of the driven coupling member 220 as the center thereof while shifting each phase by 120 degrees.

In this constitution, a position in which the three drive transmitting portions 262 simultaneously contact the three driving force receiving portions 222 corresponds to the phase shown in FIG. 42, Part (b). At this time, the rotational axes of the both coupling members can be aligned with each other with accuracy.

In this embodiment, each of the drive transmitting portion 262 and the driving force receiving portion 222 is provided at the three portions with the shifted phase of 120 degrees, so that the phases of the both coupling members coincide with each other every 120 degrees.

When the cartridge B is mounted at the cartridge mounting portion 7 of the apparatus main assembly A and the driving coupling member 250 is rotationally driven by the driving motor, the drive transmitting portions 262 of the driving coupling portion 262 and the driving force receiving portions 222 of the driven coupling member 220 are started to contact each other.

At this time, in the case where the rotational axes of the both coupling members are deviated from each other, the contact portion can be one point P1 as shown in FIG. 43, Part (a), or two points P2 and P3 as shown in FIG. 43, Part (b).

In the one point contact of FIG. 43, Part (a), when the driving coupling portion 260 is rotated in the indicated arrow R direction, the driven coupling member 220 receives a force F1 with respect to a direction perpendicular to the contact portion (point) P1. By this force, the driven coupling member 220 is moved in the direction of the force F1.

Further, in the two point contact of FIG. 43(*b*), when the driving coupling portion 260 is rotated in the indicated arrow R direction, the driven coupling member 220 receives a force F2 with respect to a direction perpendicular to the contact portion P2 and receives a force F3 with respect to a direction perpendicular to the contact portion P3. By these forces, the driven coupling member 220 is moved in a direction of the resultant force F4 of the forces F2 and F3.

Thus, finally, the both coupling members are moved so that the three drive transmitting portions 262 equivalently contact the three driving force receiving portions 222 as shown in FIG. 42, Part (b), so that their relative positions are determined. That is, in the state in which the rotational axes of the both coupling members are aligned with each other with accuracy, the drive (driving force) is transferred.

Thus, by constituting the drive transmitting portions 262 and the driving force receiving portions 222 so that the rotational axes of the both coupling members substantially coincide with each other, it is possible to align the driving axis of the apparatus main assembly A and the rotational axis of the drum unit U1 with each other with accuracy. As a result, the positional accuracy of the photosensitive drum 10 relative to the optical system 1 of the apparatus main assembly 1 is enhanced, so that improvement in image quality can be realized. Further, according to this embodiment, by the contact between the drive transmitting portions 262 and the driving force receiving portions 222, the driven coupling member 220 is relatively attracted to the driving coupling member 250. For that reason, compared with Embodiment 2, a force for urging the driven coupling member 220 against the driving coupling member 250 can be decreased. Further, the (attracting) constitution of Embodiment 1 or Embodiment 2 may also be employed in combination.

Embodiment 4

Another embodiment according to the present invention will be described.

Incidentally, in this embodiment, a constitution other than the driving side contact portion 300 (tilted portion) and the driven side contact portion 320 is similar to that in Embodiment 1, and the constitution of the drive transmitting portion is similar to that in Embodiment 3. For that reason, redundant description with respect to the respective embodiments will be omitted and members having the same functions as those in Embodiment 1 and Embodiment 3 are represented by the same reference numerals or symbols.

Parts (a) and (b) of FIG. 44 show the driving coupling member 250 and the driven coupling member 220 in this embodiment.

As shown in FIG. 42, Part (a), the driving side contact portions 300 are provided on the projections 226 constituting the driving force receiving portions 222 of the driven coupling member 220, and the driven side contact portions 320 are provided on the projections 266 constituting the drive transmitting portions 262 of the driving coupling member 250.

Phases of the both coupling members during the drive transmission are shown in FIG. 42, Part (b), which is a schematic sectional view of the coupling engaging portions as seen from the driving coupling member 250 side. The three drive transmitting portions 262 and the three driving force receiving portion 222 contact each other to transmit the driving force.

As described in Embodiment 3, the driving force is transmitted in the state in which the rotational axis of the driving coupling member 250 and the rotational axis of the driven coupling member 220 are aligned with each other with accuracy.

A state in which the cartridge B is demounted from the apparatus main assembly A will be described with reference to Parts (a) to (c) of FIG. 45 and Parts (a) to (c) of FIG. 46. Parts (a) to (c) of FIG. 45 show a state during the coupling releasing operation, and Parts (a) to (c) of FIG. 46 show a state after the coupling releasing operation. Further, Part (a) of FIG. 45 and Part (a) of FIG. 46 are perspective views of the coupling portions; Part (b) of FIG. 46 and Part (b) of FIG. 46 are sectional views of the engaging portions; and Part (c) of FIG. 45 and Part (c) of FIG. 46 are schematic sectional views of the coupling engaging portions as seen from the driving coupling portion 260 side. In the figures, the indicated arrow N represents the demounting direction of the cartridge B, i.e., the movement direction of the driven coupling member 220.

In the case where the cartridge B is pulled out of the apparatus main assembly A in the indicated arrow N direction in Parts (a) and (b) of FIG. 45 and Parts (a) and (b) of FIG. 46, at the coupling engaging portions, the driven coupling member 220 is similarly moved in the indicated arrow N direction. At this time, by pulling out the cartridge B in the state in which the driving coupling member 250 and the driven coupling member 220 contact each other at the contact portion P shown in FIG. 45, Part (c), the driven coupling member 220 is rotated in a direction indicated by an arrow R3 in the figure (integrally with the drum unit U1). That is, the driven coupling member 220 is moved in the indicated arrow N direction while being rotated in the indicated arrow R3 direction in the state in which the driven coupling member 220 contacts the driving coupling member 250 at the contact portion P.

At the same time, as shown in Parts (b) and (c) of FIG. 45, the driven side contact portion 320 at the projection 266 constituting the drive transmitting portion 262 with no contact portion P and the driving side contact portion 300 of the projection 226 constituting the driving force receiving portion 222 contact at a contact portion Q. On the driven coupling member 220, a drive transmitting axial direction component force Fc of a force Fb generated at the contact portion Q acts, so that the driven coupling member 220 is retracted in the indicated arrow L direction.

When the cartridge B is further pulled out, the driven side contact portion 320 of the driven coupling member 220 completely passes through the driving side contact portion 300, so that the engagement between the both coupling members is released as shown in Parts (a) to (c) of FIG. 46.

When the cartridge B is pulled out further, the cartridge B is taken out of the apparatus main assembly A.

In this constitution, the driven side contact portion 320 is not provided at the outer peripheral surface of the driven coupling member 220 but is located between adjacent driving force receiving portion 222 with respect to the circumferential direction of the driven coupling member 220. Further, the driven side contact portion 320 is located at the same position as or inside the driving force receiving portion 222 with respect to a radial direction of the driven coupling member 220. In other words, a distance α between the rotational axis of the driven coupling member 220 and the driven side contact portion 320 may only be required to be equal to or less than a distance β between the rotational axis of the driven coupling member 220 and the driving force receiving portion 222 (FIG. 44, Part (b)). Here, as described above, the driving force receiving portion 222 means the radially outermost part of the abutment area of the driving force receiving portion 222 when the drive transmission is effected by the abutment between the projection constituting the drive transmitting portion 262 and the projection constituting the driving force receiving portion 222. As a result, a diameter of the coupling member can be reduced, so that a small-size coupling member can be prepared. Further, according to the present invention, the driving force receiving portion 222 can be located further outward with respect to the radial direction. Therefore, the drive transmission can be effected with a smaller force.

Further, the driving side contact portion 300 is not provided at the outer peripheral surface of the driving coupling member 250 but is located between adjacent driving force transmitting portions (driving force transmitting portion) 262 with respect to the circumferential direction of the driving coupling member 250. Further, the driving side contact portion 300 is located at the same position as or inside the driving force transmitting portion 262 with respect to a radial direction of the driving coupling member 250. In other words, a distance between the rotational axis of the driving coupling member 250 and the driving side contact portion 300 may only be required to be equal to or less than a distance between the rotational axis of the driving coupling member 250 and the driving force receiving portion 222. Here, as described above, the driving force transmitting portion 262 means the radially outermost part of the abutment area of the driving force transmitting portion 262 when the drive transmission is effected by the abutment between the projection constituting the drive transmitting portion 262 and the projection constituting the driving force receiving portion 222. As a result, a diameter of the coupling member can be reduced, so that a small-size coupling member can be prepared. Further, according to the present invention, the driving force transmitting portion 262 can be located further outward with respect to the radial direction. Therefore, the drive transmission can be effected with a smaller force.

The interference avoidance, between the surface 265*a* of the projection constituting the drive transmitting portion 262 with no contact portion P and the surface 224*a* of the projection constituting the driving force receiving portion 222, described with reference to Part (c) of FIG. 28, Part (c) of FIG. 29, and Part (c) of FIG. 30 in Embodiment 1 will be described.

In this embodiment, the driving side contact portion 300 is provided at the portion corresponding to the surface 224*a* of the projection constituting the driving force receiving portion 222 of the driven coupling member 220, and the driven side contact portion 320 is provided at the portion corresponding to the surface 265*a* of the projection constituting the drive transmitting portion 262 of the driving coupling portion 260. Therefore, the interference between the surface 265*a* of the projection and the surface 224*a* of the projection (another projection) is the contact between the driving side contact portion 300 and the driven side contact portion 320.

As has already been described above, by this contact, the driven coupling member 220 is retracted in the drum rotational axial direction, so that the interference does not occur. For that reason, there is no need to provide the clearance for avoiding the interference (contact), so that the projection 226 and the projection 266 can be increased in size. As a result, the drive transmitting portion can be increased in strength, so that accurate drive transmission can be effected.

Further, as shown in FIG. 47, a similar effect can be obtained even in a constitution in which the driving side contact portion 300 (tilted portion) is provided at the projection 266 portion constituting the drive transmitting portion 262 of the driving coupling portion 260 and the driven side contact portion 320 is provided at the projection 226 portion constituting the driving force receiving portion 222 of the driven coupling member 220. Further, both of the driving side contact portion 300 and the driven side contact portion 320 may also be the tilted portion.

Further, in this embodiment, the constitution of Embodiment 1 (attracting constitution), Embodiment 2 (attracting constitution), or Embodiment 3 (constitution for aligning the coupling rotational axes) may also be employed in combination.

According to the above-described embodiments, even when the driving coupling member provided in the apparatus main assembly is not retracted in the axial direction, the cartridge B is moved in the direction substantially perpendicular to the axis of the driving shaft, so that the cartridge B can be mounted in and demounted from the apparatus main assembly A.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 111127/2009 filed Apr. 30, 2009, which is hereby incorporated by reference.

What is claimed is:

1. A cartridge comprising:
- a casing;
- developer contained within the casing;
- a photosensitive drum rotatable about an axis thereof;
- a drum flange provided at one end portion of the photosensitive drum, the drum flange being configured to transmit a driving force to the photosensitive drum, the drum flange being rotatable together with the photosensitive drum about the axis of photosensitive drum, and the drum flange including a hollow interior portion elongated along the axis of the photosensitive drum;
- a coupling member operatively connected to the drum flange, the coupling member being configured to transmit the driving force to the drum flange, the coupling member being coaxially rotatable with the drum flange, the coupling member including (i) at least one projection for receiving the driving force, the at least one projection being provided at an end portion of the coupling member, and (ii) a shaft portion elongated along an axis of the coupling member, the coupling member being movable with respect to the drum flange in a direction of the axis of the photosensitive drum, with the at least one projection and the shaft portion being movable with the coupling member in the direction of the axis of the photosensitive drum; and
- a coil spring urging the coupling member in a direction away from an interior of the casing along the axis of the photosensitive drum,
- wherein the drum flange has an opening at one end and is closed at another end, and the opening leads to the hollow interior portion,
- wherein an end portion of the coil spring contacts an interior surface of the closed end of the drum flange, and
- wherein the drum flange includes a housing and a cover member attached to the housing, with the closed end of the drum flange being a part of the cover member.

2. The cartridge of claim 1, wherein the cover member includes a claw portion that engages with the housing.

3. The cartridge of claim 2, wherein a part of the claw portion enters an engaging hole of the housing.

4. The cartridge of claim 1, wherein the drum flange is provided with a gear portion on an outer surface thereof.

5. The cartridge of claim 4, wherein the closed end of the drum flange includes an engaging portion that engages the end portion of the coil spring.

6. The cartridge of claim 5, wherein the engaging portion includes a projection surrounded by the end portion of the coil spring.

7. The cartridge of claim 5, wherein the coil spring is compressed between the coupling member and the closed end of the drum flange.

8. The cartridge of claim 1, further comprising a developing roller,
- wherein the drum flange is operatively connected to the developing roller.

9. The cartridge of claim 1, wherein the end portion of the coupling member includes a recessed surface, and the at least one projection projects from a surface adjacent to the recessed surface.

10. The cartridge of claim 1, wherein the end portion of the coupling member includes an inclined surface, and a maximum distance from the axis of the coupling member to the inclined surface along a line perpendicular to the axis of the coupling member decreases as a distance along the axis of the coupling member from the shaft portion increases.

11. A cartridge comprising:
- a casing;
- developer contained within the casing;
- a rotatable member rotatably supported in the casing to permit rotation about an axis thereof;
- a cylindrical member rotatably supported in the casing to permit rotation about an axis thereof, the cylindrical member including a hollow interior portion elongated along the axis of the cylindrical member, the cylindrical member being operatively connected to the rotatable member to transmit a rotational driving force to the rotatable member;
- a coupling member operatively connected to the cylindrical member, the coupling member being configured to transmit the rotational driving force to the cylindrical member, the coupling member being coaxially rotatable with the cylindrical member, the coupling member including (i) at least one projection for receiving the rotational driving force, the at least one projection being provided at an end portion of the coupling member, and (ii) a shaft portion elongated along an axis of the coupling member, the coupling member being movable with respect to the cylindrical member in a direction of the axis of the cylindrical member, with the at least one projection and the shaft portion being movable with the coupling member in the direction of the axis of the cylindrical member; and a coil spring urging the coupling member in a direction away from an interior of the casing along the axis of the cylindrical member, wherein the cylindrical member has an opening at one end portion and is closed at another end, and the opening leads to the hollow interior portion, wherein an end portion of the coil spring contacts an interior surface of the closed end of the cylindrical member, and wherein the cylindrical member includes a housing and a cover member attached to the housing, with the closed end of the cylindrical member being a part of the cover member.

12. The cartridge of claim 11, wherein the cover member includes a claw portion that engages with the housing.

13. The cartridge of claim 12, wherein a part of the claw portion enters an engaging hole of the housing.

14. The cartridge of claim 11, wherein the cylindrical member is provided with a gear portion on an outer surface thereof.

15. The cartridge of claim 11, wherein the rotatable member is a photosensitive drum, and wherein the cylindrical member is provided at an end of the rotatable member with the axis of the cylindrical member being coaxial with the axis of the rotatable member.

16. The cartridge of claim 11, further comprising a developing roller, wherein the cylindrical member is operatively connected to the developing roller.

17. The cartridge of claim 11, wherein the axis of the rotatable member is coaxial with the axis of the cylindrical member.

18. The cartridge of claim 11, wherein the cylindrical member includes an interior surface at least a part of which is configured to prevent the coupling member from inclining with respect to the axis of the cylindrical member.

19. The cartridge of claim 11, wherein the rotatable member is a developing roller.

20. The cartridge of claim 11, wherein the end portion of the coupling member includes a recessed surface, and the at least one projection projects from a surface adjacent to the recessed surface.

* * * * *